United States Patent
Satou et al.

(10) Patent No.: US 7,587,427 B2
(45) Date of Patent: Sep. 8, 2009

(54) HIERARCHICAL STORAGE SYSTEM, AND CONTROL METHOD AND PROGRAM THEREFOR

(75) Inventors: Akira Satou, Kawasaki (JP); Kazuma Takatsu, Kawasaki (JP); Motohiro Sakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 721 days.

(21) Appl. No.: 11/299,950

(22) Filed: Dec. 13, 2005

(65) Prior Publication Data

US 2007/0078901 A1    Apr. 5, 2007

(30) Foreign Application Priority Data

Sep. 30, 2005    (JP) ............................. 2005-286248

(51) Int. Cl.
*G06F 17/30*    (2006.01)
(52) U.S. Cl. .................. 707/200; 707/204; 707/202; 707/7; 707/6
(58) Field of Classification Search ................. 707/200
See application file for complete search history.

(56) References Cited

U.S. PATENT DOCUMENTS

| | | | |
|---|---|---|---|
| 5,109,505 A * | 4/1992 | Kihara | ........................ 714/5 |
| 5,734,895 A * | 3/1998 | Matsuo | ........................ 707/202 |
| 5,878,410 A * | 3/1999 | Zbikowski et al. | ............. 707/2 |
| 6,226,411 B1 * | 5/2001 | Hiyoshi | ....................... 382/232 |
| 6,910,100 B2 * | 6/2005 | Lewalski-Brechter | ....... 711/114 |
| 7,032,085 B2 * | 4/2006 | Kurokawa et al. | .......... 711/154 |
| 7,240,235 B2 * | 7/2007 | Lewalski-Brechter | .......... 714/6 |
| 2001/0029591 A1 * | 10/2001 | Takeda | ......................... 714/5 |
| 2003/0177308 A1 * | 9/2003 | Lewalski-Brechter | ....... 711/114 |
| 2007/0103960 A1 * | 5/2007 | Hamberg et al. | ............ 365/145 |

FOREIGN PATENT DOCUMENTS

| | | |
|---|---|---|
| JP | 60-179857 | 9/1985 |
| JP | 2-123438 | 5/1990 |
| JP | 9-297699 | 11/1997 |

* cited by examiner

*Primary Examiner*—Hung Vy
*Assistant Examiner*—Binh V Ho
(74) *Attorney, Agent, or Firm*—Staas & Halsey LLP

(57) ABSTRACT

At power-on again, a restore processing unit restores block information tables from a primary storage to a volatile memory. After classifying the block information tables into group-specific links of a plurality of time zones, a first sort processing unit connects the group-specific links to form a group classification link. Then, a second sort processing unit sequentially retrieves the block information tables of the group classification link from the earliest time stamp side for insertion in a position so as to achieve a time-stamp ascending order, thereby reconfiguring the links.

13 Claims, 36 Drawing Sheets

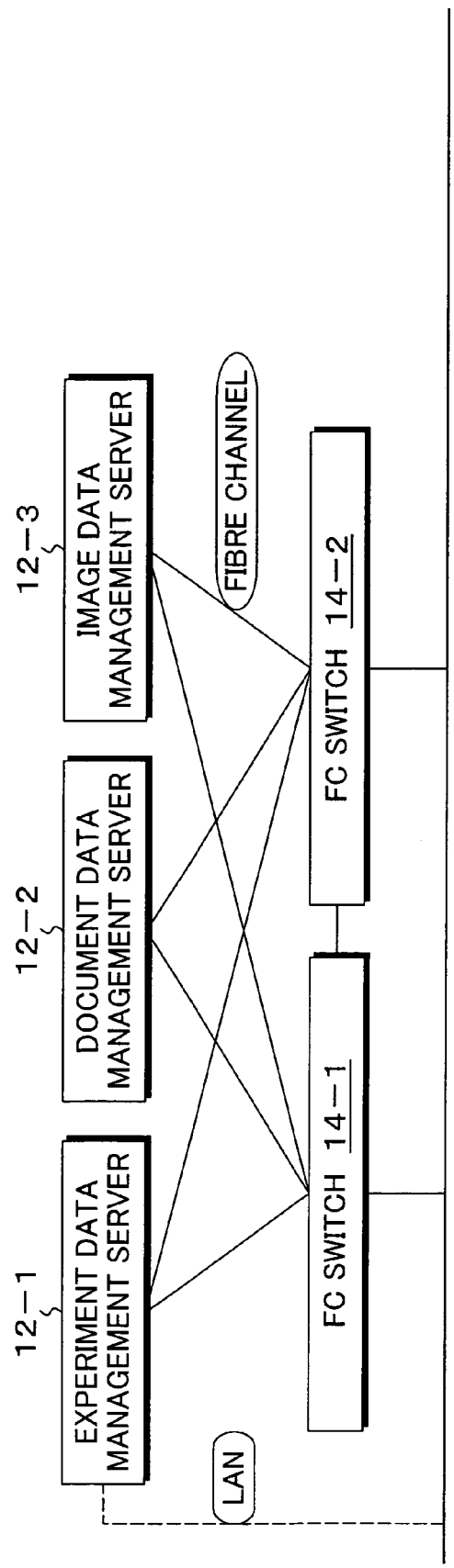

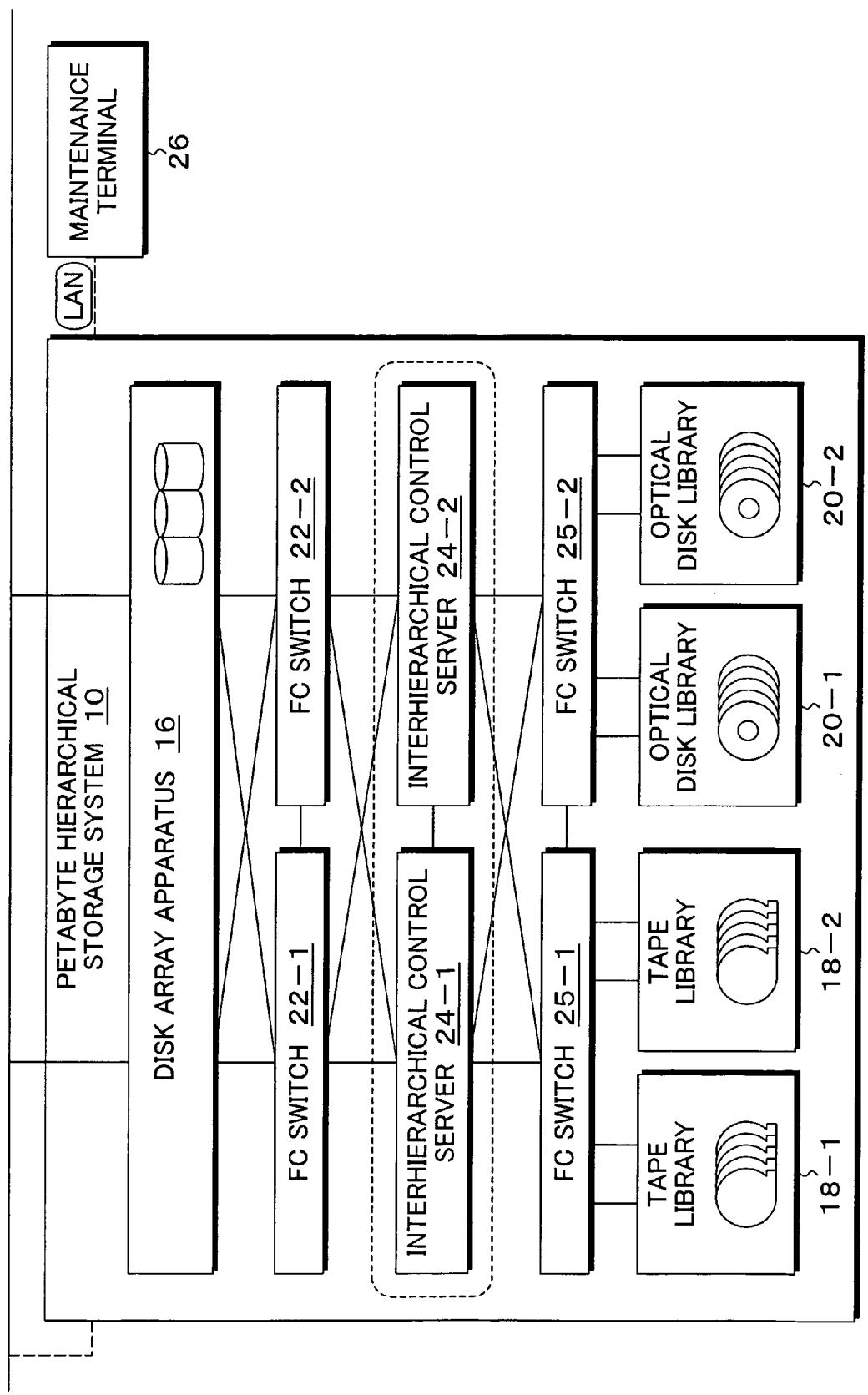

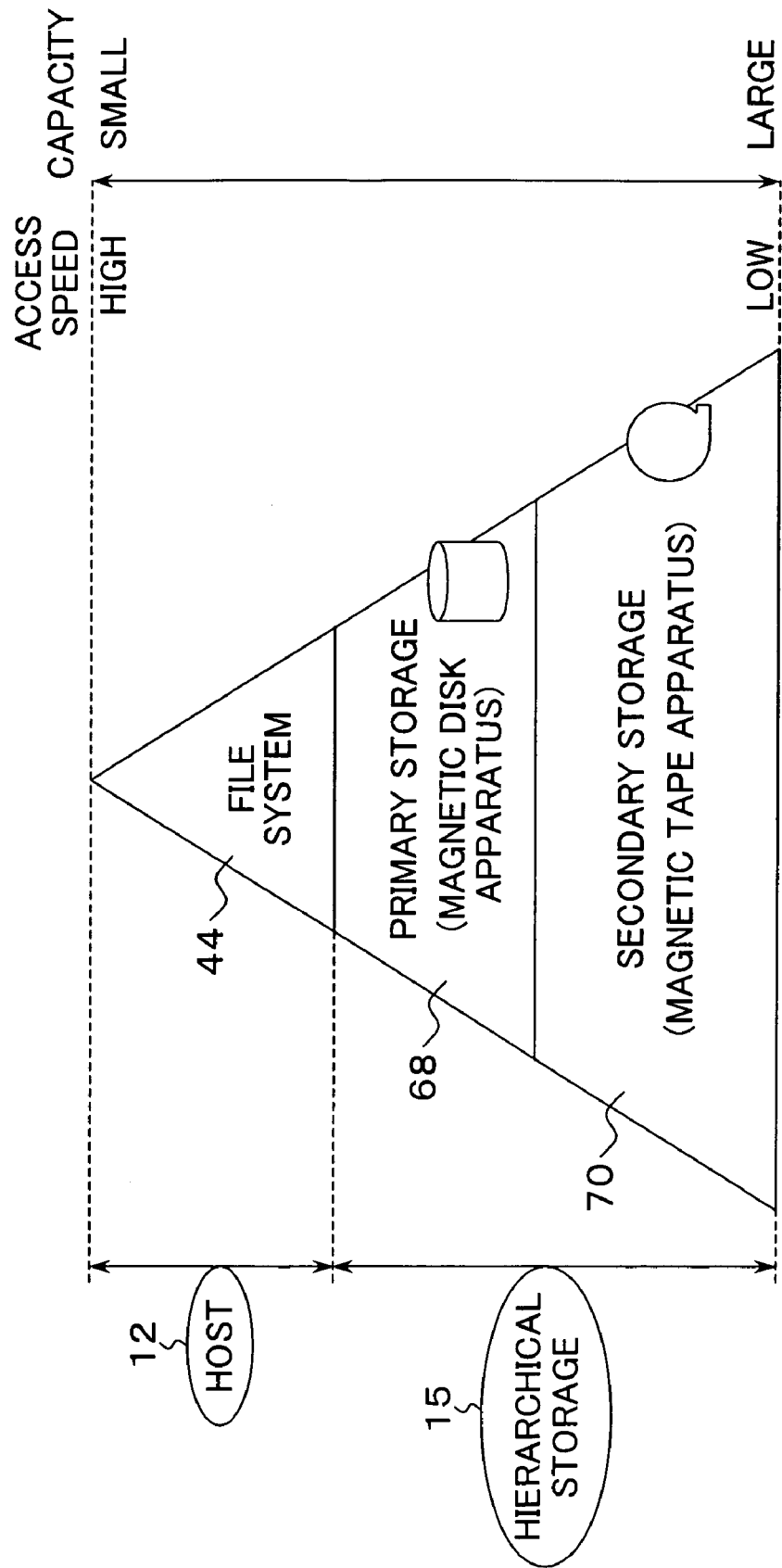

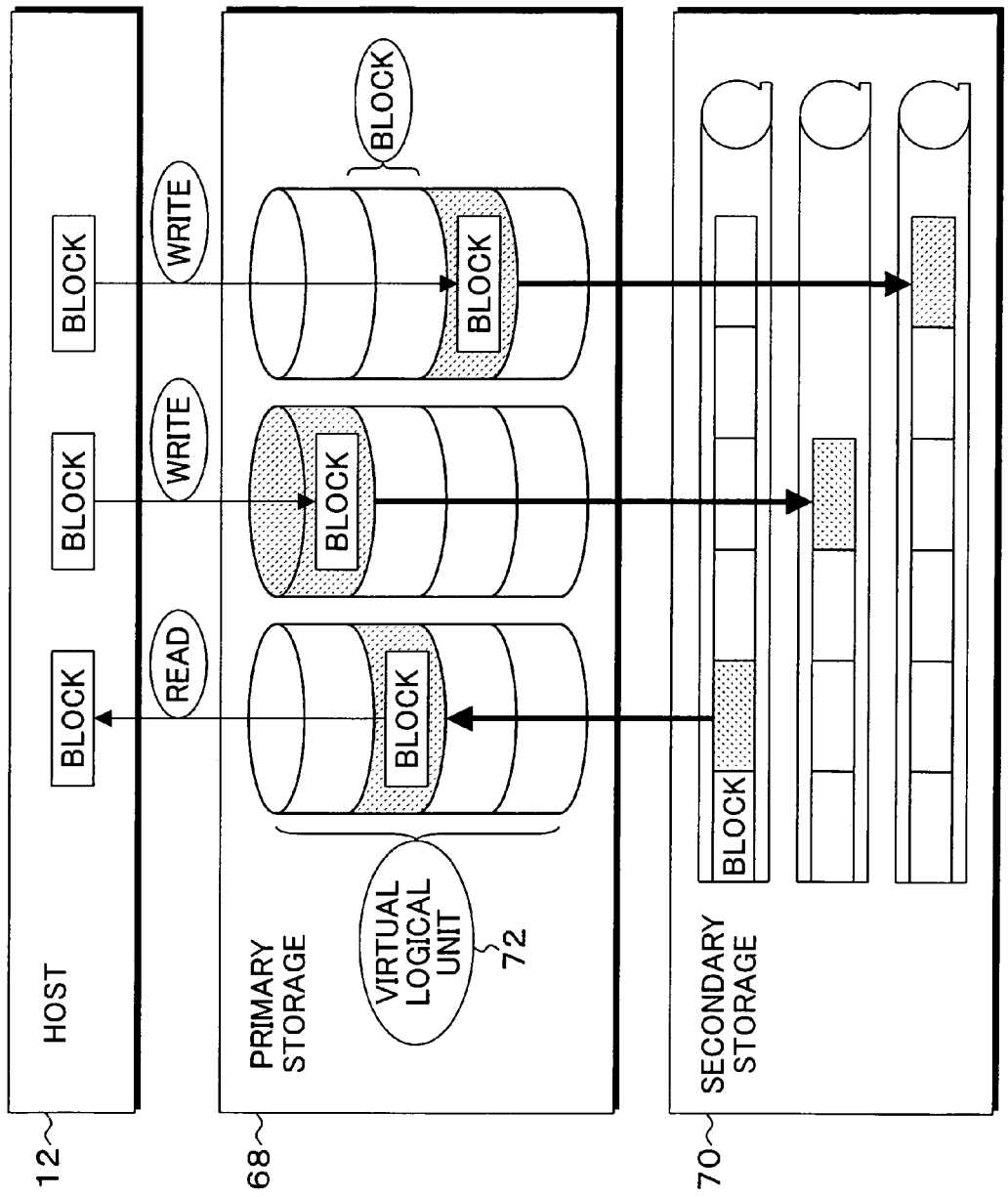

FIG. 10

| | BIT<br>BYTE | 7 | 6 | 5 | 4 | 3 | 2 | 1 | 0 | |
|---|---|---|---|---|---|---|---|---|---|---|
| (1) | 0-3 | | | | INDEX NUMBER | | | | | |
| (2) | 4 | | | | VALID/INVALID FLAG | | | | | |
| (3) | 5 | | | | VTOC INFORMATION FLAG | | | | | |
| (4) | 6 | | | | DATA BLOCK STATUS | | | | | ← 124 |
| (5) | 7 | | | | BIND STATUS | | | | | |
| (6) | 8-15 | | | | DATA BLOCK UNIT SIZE | | | | | |
| (7) | 16-23 | | | | DATA BLOCK ALLOCATION STARTING ADDRESS ON REAL DISK | | | | | |
| (8) | 24-25 | | | | REAL DISK NUMBER | | | | | |
| (9) | 26-27 | | | | VIRTUAL LOGICAL UNIT NUMBER | | | | | |
| (10) | 28-29 | | | | DATA BLOCK NUMBER ON VIRTUAL LOGICAL UNIT | | | | | |
| (11) | 30 | | | | ALLOCATION CONTROL MODULE NUMBER | | | | | |
| (12) | 31 | | | | ROLE CONTROL MODULE NUMBER | | | | | |
| (13) | 32-39 | | | | TIME STAMP INFORMATION | | | | | ← 126 |
| (14) | 40 | | | | SYNCHRONIZATION CONTROL FLAG | | | | | |
| (15) | 41-63 | | | | RESERVED (23 BYTE) | | | | | |

| | BIT<br>BYTE | 7 | 6 | 5 | 4 | 3 | 2 | 1 | 0 | |
|---|---|---|---|---|---|---|---|---|---|---|
| (1) | 0-3 | | | | LINK TABLE INDEX NUMBER | | | | | |
| (2) | 4-7 | | | | POINTER OF UPPER MANAGEMENT TABLE | | | | | |
| (3) | 8-11 | | | | POINTER TO BLOCK INFORMATION TABLE | | | | | |
| (4) | 12-15 | | | | POINTER TO REAL DISK MANAGEMENT BUFFER | | | | | |
| (5) | 16-23 | | | | PREVIOUS/SUBSEQUENT INFORMATION ABOUT HIT LINK/DIRTY LINK | | | | | ←128 |
| (6) | 24-31 | | | | PREVIOUS/SUBSEQUENT INFORMATION ABOUT LRU LINK | | | | | ←130 |
| (7) | 32-39 | | | | PREVIOUS/SUBSEQUENT INFORMATION ABOUT VIRTUAL LOGICAL UNIT LINK | | | | | |
| (8) | 40-47 | | | | PREVIOUS/SUBSEQUENT INFORMATION ABOUT REAL LOGICAL UNIT LINK | | | | | |
| (9) | 48-55 | | | | HEADER/TAIL INFORMATION ABOUT INPUT/OUTPUT WAIT QUEUE | | | | | |
| (10) | 56-63 | | | | PREVIOUS/SUBSEQUENT INFORMATION ABOUT FREE LINK | | | | | |
| (11) | 64 | | | | BLOCK EXCLUSIVE FLAG | | | | | |
| (12) | 65 | | | | TIME STAMP INFORMATION SYNCHRONIZATION FLAG | | | | | |
| (13) | 66 | | | | DELETE RESERVATION FLAG | | | | | |
| (14) | 67 | | | | EVENT FLAG | | | | | |
| (15) | 68-69 | | | | RESERVED | | | | | |
| (16) | 70-71 | | | | ........ | | | | | |
| (17) | 72-73 | | | | THE NUMBER OF RUNNING WRITE COMMANDS | | | | | |
| (18) | 74-75 | | | | THE NUMBER OF RUNNING READ COMMANDS | | | | | |
| (19) | 76-77 | | | | THE NUMBER OF WAITING WRITE COMMANDS | | | | | |
| (20) | 78-79 | | | | THE NUMBER OF WAITING READ COMMANDS | | | | | |
| (21) | 80-83 | | | | DEBUG INFORMATION | | | | | |
| (22) | 84-87 | | | | DEBUG INFORMATION | | | | | |
| (23) | 88-95 | | | | RESERVED | | | | | |

114

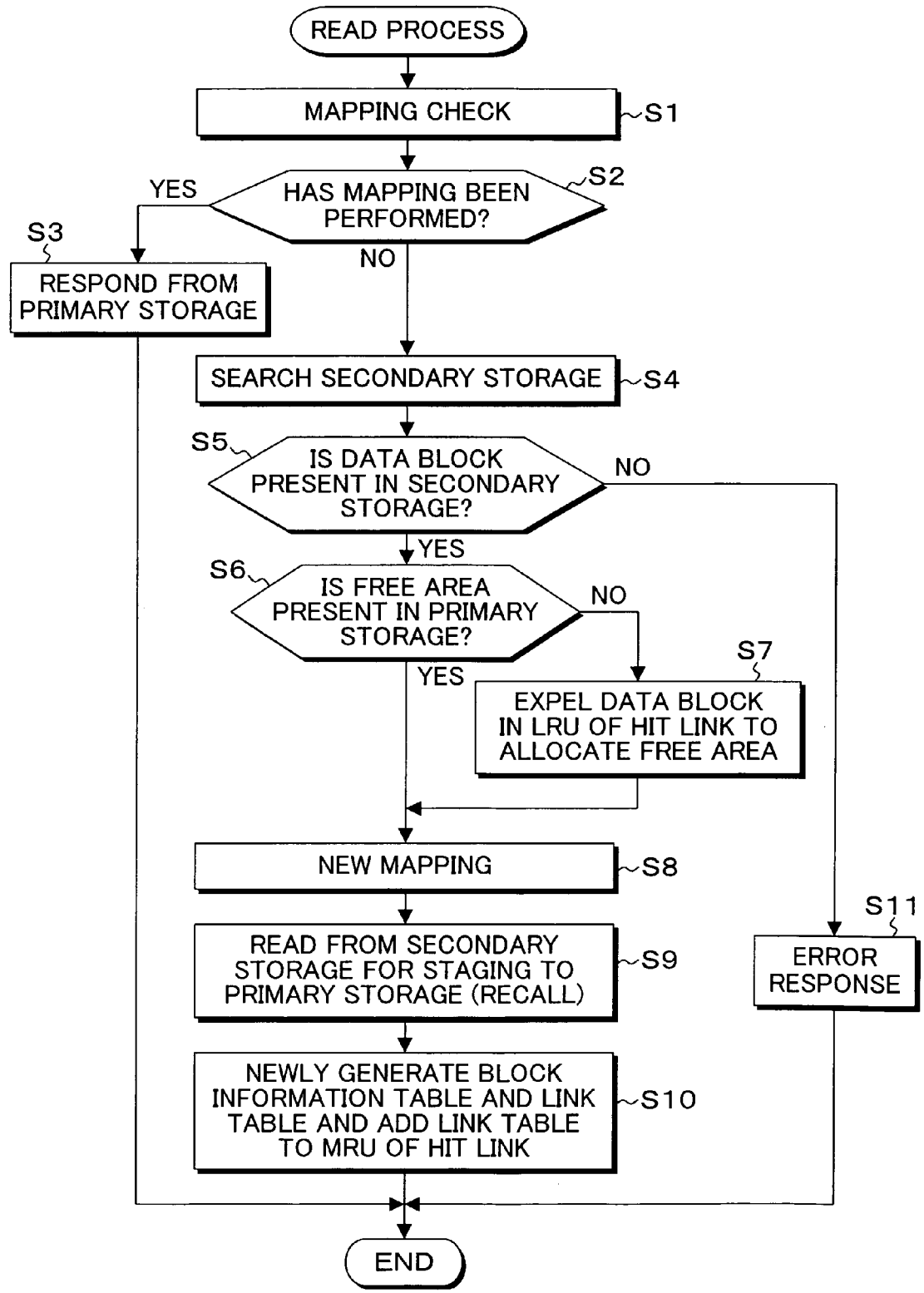

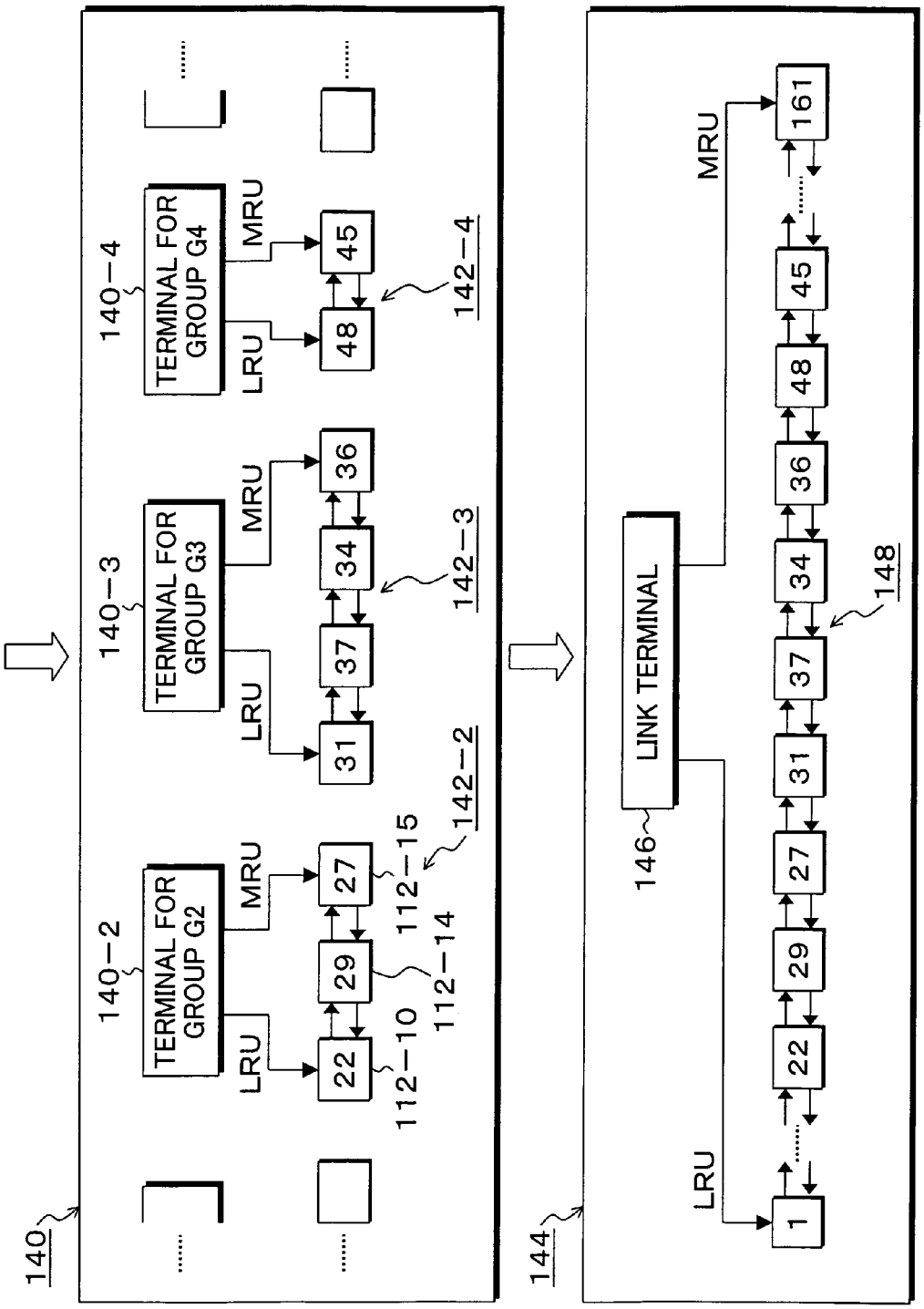

152

| EXAMPLE OF DECISION BITS b2 b1 b0 | ALGORITHM CASE |
|---|---|
| 1  1  1 | FIRST CASE |
| 1  1  0 | SECOND CASE |
| 1  0  1 | THIRD CASE |
| 1  0  0 | FOURTH CASE |
| 0  1  1 | FIFTH CASE |
| 0  1  0 | SIXTH CASE |
| 0  0  1 | SEVENTH CASE |
| 0  0  0 | EIGHTH CASE |

FIRST CASE (b2b1b0=111)

| TABLE NAME | PRE-INSERT-POSITION TABLE A | POST-INSERT-POSITION TABLE B | | PRE-TARGET-POSITION TABLE X | PROCESS TARGET TABLE Y | | POST-TARGET-POSITION TABLE Z |
|---|---|---|---|---|---|---|---|
| POINTER NAME | BACK POINTER | FRONT POINTER | BACK POINTER | BACK POINTER | FRONT POINTER | BACK POINTER | FRONT POINTER |
| BEFORE INSERTION | B | A | — | Z | X | Z | Y |
| AFTER INSERTION | Y | Y | — | Z | A | B | X |

SECOND CASE (b2b1b0=110)

| TABLE NAME | PRE-INSERT-POSITION TABLE A | POST-INSERT-POSITION TABLE B | | PRE-TARGET-POSITION TABLE X | PROCESS TARGET TABLE Y | | POST-TARGET-POSITION TABLE Z |
|---|---|---|---|---|---|---|---|
| POINTER NAME | BACK POINTER | FRONT POINTER | BACK POINTER | BACK POINTER | FRONT POINTER | BACK POINTER | FRONT POINTER |
| BEFORE INSERTION | B | A | Y | — | B | Z | Y |
| AFTER INSERTION | Y | Y | Z | — | A | B | X |

THIRD CASE (b2b1b0=101)

| TABLE NAME | PRE-INSERT-POSITION TABLE A | POST-INSERT-POSITION TABLE B | | PRE-TARGET-POSITION TABLE X | PROCESS TARGET TABLE Y | | POST-TARGET-POSITION TABLE Z |
|---|---|---|---|---|---|---|---|
| POINTER NAME | BACK POINTER | FRONT POINTER | BACK POINTER | BACK POINTER | FRONT POINTER | BACK POINTER | FRONT POINTER |
| BEFORE INSERTION | B | A | — | Y | X | NULL | — |
| AFTER INSERTION | Y | Y | — | NULL | A | B | — |

FOURTH CASE (b2b1b0=100)

| TABLE NAME | PRE-INSERT-POSITION TABLE A | | POST-INSERT-POSITION TABLE B | | PRE-TARGET-POSITION TABLE X | | PROCESS TARGET TABLE Y | | POST-TARGET-POSITION TABLE Z | |
|---|---|---|---|---|---|---|---|---|---|---|
| POINTER NAME | BACK POINTER | | FRONT POINTER | BACK POINTER | FRONT POINTER | BACK POINTER | FRONT POINTER | BACK POINTER | FRONT POINTER | |
| BEFORE INSERTION | A | | A | Y | — | — | B | NULL | — | |
| AFTER INSERTION | Y | | Y | NULL | — | — | A | B | — | |

FIFTH CASE (b2b1b0=011)

| TABLE NAME | PRE-INSERT-POSITION TABLE A | POST-INSERT-POSITION TABLE B | | PRE-TARGET-POSITION TABLE X | PROCESS TARGET TABLE Y | | POST-TARGET-POSITION TABLE Z |
|---|---|---|---|---|---|---|---|
| POINTER NAME | BACK POINTER | FRONT POINTER | BACK POINTER | BACK POINTER | FRONT POINTER | BACK POINTER | FRONT POINTER |
| BEFORE INSERTION | — | NULL | — | Y | X | Z | Y |
| AFTER INSERTION | — | Y | — | Z | NULL | B | X |

SIXTH CASE (b2b1b0=010)

| TABLE NAME | PRE-INSERT -POSITION TABLE A | | POST-INSERT- POSITION TABLE B | | PRE-TARGET -POSITION TABLE X | | PROCESS TARGET TABLE Y | | POST-TARGET -POSITION TABLE Z | |
|---|---|---|---|---|---|---|---|---|---|---|
| POINTER NAME | BACK POINTER | | FRONT POINTER | BACK POINTER | BACK POINTER | | FRONT POINTER | BACK POINTER | FRONT POINTER | |
| BEFORE INSERTION | – | | NULL | Y | – | | B | Z | Y | |
| AFTER INSERTION | – | | Y | Z | – | | NULL | B | B | |

SEVENTH CASE (b2b1b0=001)

| TABLE NAME | PRE-INSERT-POSITION TABLE A | | POST-INSERT-POSITION TABLE B | | PRE-TARGET-POSITION TABLE X | | PROCESS TARGET TABLE Y | | POST-TARGET-POSITION TABLE Z | |
|---|---|---|---|---|---|---|---|---|---|---|
| POINTER NAME | BACK POINTER | | FRONT POINTER | BACK POINTER | FRONT POINTER | BACK POINTER | FRONT POINTER | BACK POINTER | FRONT POINTER | |
| BEFORE INSERTION | — | | NULL | — | Y | NULL | X | NULL | — | — |
| AFTER INSERTION | — | | Y | — | NULL | NULL | X | B | — | — |

EIGHTH CASE (b2b1b0=000)

| TABLE NAME | PRE-INSERT-POSITION TABLE A | POST-INSERT-POSITION TABLE B | | PRE-TARGET-POSITION TABLE X | PROCESS TARGET TABLE Y | | POST-TARGET-POSITION TABLE Z |
|---|---|---|---|---|---|---|---|
| POINTER NAME | BACK POINTER | FRONT POINTER | BACK POINTER | BACK POINTER | FRONT POINTER | BACK POINTER | FRONT POINTER |
| BEFORE INSERTION | – | NULL | Y | – | B | NULL | – |
| AFTER INSERTION | – | Y | NULL | – | NULL | B | – | us# HIERARCHICAL STORAGE SYSTEM, AND CONTROL METHOD AND PROGRAM THEREFOR

This application is a priority based on prior application No. JP 2005-286248, filed Sep. 30, 2005, in Japan.

BACKGROUND OF THE INVENTION

1. Field of the Invention

The present invention relates to a hierarchical storage system having a hierarchical storage configuration with a primary storage, such as a disk apparatus, and a secondary storage, such as a magnetic tape apparatus, and a control method and a program for such a hierarchical storage system. In particular, the present invention relates to a hierarchical storage system in which the primary storage is used as a cache apparatus of the secondary storage and links for use to allow an autonomous data rearranging operation between the primary storage and the secondary storage are sorted in time-stamp order for reconfiguration, and a control method and a program for such a hierarchical storage system.

2. Description of the Related Arts

Conventionally, as a storage system having a large capacity of a petabyte size, a hierarchical storage system is constructed with a data hierarchical configuration using a high-speed storage device, such as a magnetic disk apparatus, as a primary storage and a low-speed storage device, such as a magnetic tape apparatus, as a secondary storage. In such a large-capacity hierarchical storage system, with the primary storage being handled as a cache apparatus of the secondary storage, data with a high frequency of access is disposed in the primary storage, which is closer to a host, whilst data with a low frequency of access is disposed in the secondary storage, which is away from the host, thereby increasing access performance. In an input/output process of a hierarchical storage using the primary storage as a cache apparatus of the secondary storage, a block information table is created and managed for each data block, which is a data input/output unit in the primary storage and the secondary storage. This block information table is generated on a memory when a higher-level apparatus writes block data in the primary storage, and has stored therein a time stamp indicative of a write time, a status in hierarchical storage, and others. Also, a link table is created on the memory simultaneously with the block information tables to construct a link in which the block information tables are connected by pointers in time-stamp order. Examples of a link in which the block information tables are connected by pointers in time-stamp order are a dirty link, a hit link, and LRU link. In the hit link, block information tables of data blocks that are present in both of the primary storage and the secondary storage and are in synchronization with each other are connected in time-stamp order. In the dirty link, block information tables of data blocks that are present in the primary storage but not present in the secondary storage or those that are present in both storages but are not in synchronization with each other are connected in time-stamp order. Furthermore, in the LRU link, block information tables of all data blocks that are present in the primary storage are connected in time-stamp order. Furthermore, the block information tables on the memory is backed up by being written in a system area of the primary storage in each predetermined timing.

[First Patent Document] Japanese Patent Laid-Open Publication No. 9-297699

[Second Patent Document] Japanese Patent Laid-Open Publication No. 60-179857

[First Patent Document] Japanese Patent Laid-Open Publication No. 02-123438

However, in such a conventional hierarchical storage system, the block information tables and link table managed on the memory are required to be stored in a system volume of the primary storage and be backed up even if they are lost due to a power shutdown. There is a problem, however, where due to restrictions on a backup area in the primary volume, only the block information tables are backed up and the link table is not backed up. This is because the number of data blocks that can be stored in the primary storage functioning as a cache apparatus of the secondary storage will be as many as approximately one hundred and fifty thousands when, for example, it is assumed that the capacity of the primary storage is 32 terabytes (TB) and a block size is 256 megabytes (MB), and the corresponding number of block information tables are generated on the memory. Therefore, in the system volume of the primary storage, an area for storing block information tables of one hundred and fifty thousand blocks has to be allocated for backup. In addition, if a link table storage area having stored therein pointers of the dirty link and the hit link connecting block management tables (block information tables) of one hundred and 150,000 blocks is allocated in the system volume, an allocated area of the system volume in the primary storage is increased to restrict a user area. Furthermore, in order to reduce an entire backup time at a power shutdown, a backup of storing the link table in the secondary storage is not performed. Moreover, in a scheme of backing up the link table at a power shutdown and reconfiguring the link at power-on again, part of a plurality of memories is degraded at power-on and, upon separation, the link is broken due to a link's characteristic that "the block information tables are contextually connected by pointers". Also for this reason, the link table is not backed up to the secondary storage. Thus, when the power is shut down and then turned on again during the operation of the hierarchical storage system, the link table constructing the dirty link, the hit link, and the LRU link on the memory is lost due to a power shutdown. To address this problem, it is required during an initialization process after the power is turned on again that the block information tables stored in the primary storage be restored in the memory, the block information tables be classified by status into hit and dirty, and a hit link, a dirty link, and an LRU link each connected in time-stamp order are reconfigured. However, to reconfigure these links, first an initial link is configured by searching block management tables (block information tables) restored on the memory in address order and then connecting these tables by pointers. However, the connection of this initial link is not in time-stamp order. Thus, for the initial link, a sort process of examining time stamps of the block information tables from the head of the link and then rearranging in the order in which the earliest time stamp comes first is required. However, the reconfigured table link has a link length of, for example, one hundred and 150,000 at the longest corresponding to the block size of the primary storage, and therefore a sort process of rearranging such a long link in time-stamp order takes a considerable time. In particular, only about several minutes at the longest are allowed from power-on again until an input/output process can be performed after an initialization process. During this initialization process, it is impossible to end a link sort process. To get around this problem, for the reconfigured link, a sort process of rearranging in time-stamp order is not performed, and the link remains in address order. For a block information table of a data block written with a write command from the host after power-on again, arrangement in time-stamp order on the link is ensured. Thus, a portion of the link including block information tables generated before power-on again is not arranged in time-stamp order. For example, when a table at the earliest (LRU side) of the hit link is expelled so as to allocate a space area in the primary storage, a data block with a new time stamp is expelled, and a data block with an old time stamp remains. Thus, an input/output request to the primary storage does not hit and therefore the frequency of access to the secondary storage is increased, thereby disadvantageously reducing input/output performance of the system.

SUMMARY OF THE INVENTION

According to the present invention to provide a hierarchical storage system allowing high-speed, short-time reconfiguration of a table arrayed in time-stamp order to be achieved at power-on again, and a control method and a program for such a hierarchical storage system.

(System)

The present invention provides a hierarchical storage system. The hierarchical storage system targeted by the present invention includes:

a hierarchical storage unit formed of a primary storage using a high-speed, small-capacity storage apparatus and a secondary storage using a low-speed, large-capacity storage apparatus, with the primary storage being used as a cache apparatus of the secondary storage, a block information table managing unit that generates, when a data block is written in the primary storage, a block information table on a volatile memory for management, the block information table having stored therein a time stamp, and writes a group of block information tables on the volatile memory in the primary storage in each predetermined timing for storage;

a link managing unit that generates, when the block information table is generated, a link on the volatile memory, the link having the block information table inserted in a position so as to achieve a time-stamp order and connected by pointers, and generates a link table having stored therein the pointers for management on the volatile memory; and an input/output processing unit that performs an input/output process of the hierarchical storage unit based on a mapping check upon reception of an input/output request of a data block from a higher-level apparatus, In the present invention, the hierarchical storage system includes:

a restore processing unit that restores block information tables from the primary storage to the volatile memory at power-on again;

a first sort processing unit that classifies the restored block information tables into group-specific links of a plurality of time zones and then forms a group classification link by connecting group-specific links in temporal order; and a second sort processing unit that sequentially retrieves the block information tables of the group-specific links from an earliest time stamp side for insertion in a position so as to achieve a time-stamp ascending order to reconfigure the link.

Here, the link managing unit generates the link table corresponding to each block information table when the block information table is restored by the restore processing unit to the volatile memory, and stores the pointers connecting the link in the link table when a link is formed by the first sort processing unit and the second sort processing unit.

The first sort processing unit generates a plurality of group-specific links by dividing a time period from an earliest time stamp to a latest time stamp obtained through a search from the restored block information tables into a predetermined number of time zones, retrieves one of the block information tables in address order and inserts the block information table in one of the group-specific links to which a time stamp belongs for connection in address order, and connects the group-specific links in temporal order after grouping to form the group classification link For a connection change process of inserting a process target table in an arrayed link at a position so as to achieve a time-stamp order, with an LRU side of the link being taken as a front and an MRU side of the link being taken as a back, the second sort processing unit sets in advance eight connection change process cases based on combinations of three conditions of:

(1) a first condition indicating whether a pre-insert-position table (A) is present;

(2) a second condition indicating whether the process target table (Y) has a post-target-position table (Z); and (3) a third condition indicating whether a post-insert-position table (B) and the process target table (Y) are adjacent to each other, and every time a process target table is extracted, determines the three conditions to select relevant one of the connection change process cases and perform the connection change process.

(First Case)

In a first case where, as the three conditions, a pre-insert-position table (A) is present, the process target table (Y) has a post-target-position table (Z), and a post-insert-position table (B) and further the process target table (Y) are not adjacent to each other, the second sort processing unit changes an indication of a back pointer of the pre-insert-position table (A) to the process target table (Y), changes an indication of a front pointer of the post-insert-position table (B) to the process target table (Y), changes an indication of a back pointer of a pre-process-target-position table (X) to the post-target-position table (Z), and further changes an indication of a front pointer of the process target table (Y) to the pre-insert-position table (A) and an indication of a back pointer thereof to the post-insert-position table (B).

(Second Case)

In a second case where, as the three conditions, a pre-insert-position table (A) is present, the process target table (Y) has a post-target-position table (Z), and further a post-insert-position table (B) and the process target table (Y) are adjacent to each other, the second sort processing unit changes an indication of a back pointer of the pre-insert-position table (A) to the process target table (Y), changes an indication of a front pointer of the post-insert-position table (B) to the process target table (Y) and an indication of a back pointer thereof to the post-target-position table (Z), changes an indication of a front pointer of the process target table (Y) to the pre-insert-position table (A) and an indication of a back pointer thereof to the post-insert-position table (B), and further changes an indication of a back pointer of the post-target-position (Z) to the post-insert-position table (B).

(Third Case)

In a third case where, as the three conditions, a pre-insert-position table (A) is present, the process target table (Y) does not have a post-target-position table (Z), and further a post-insert-position table (B) and the process target table (Y) are not adjacent to each other, the second sort processing unit changes an indication of a back pointer of the pre-insert-position table (A) to the process target table (Y), changes an indication of a front pointer of the post-insert-position table (B) to the process target table (Y), changes an indication of a back pointer of a pre-target-position table (X) to a link rear end (NULL), and further changes an indication of a front pointer of the process target table (Y) to the pre-insert-position table (A) and an indication of a back pointer thereof to the post-insert-position table (B).

(Fourth Case)

In a fourth case where, as the three conditions, a pre-insert-position table (A) is present, the process target table (Y) does not have a post-target-position table (Z), and further a post-insert-position table (B) and the process target table (Y) are adjacent to each other, the second sort processing unit changes an indication of a back pointer of the pre-insert-position table (A) to the process target table (Y), changes an indication of a front pointer of the post-insert-position table (B) to the process target table (Y) and an indication of a back pointer thereof to a link rear end (NULL), and further changes an indication of a front pointer of the process target table (Y) to the pre-insert-position table (A) and an indication of a back point thereof to the post-insert-position table (B).

(Fifth Case)

In a fifth case where, as the three conditions, a pre-insert-position table (A) is not present, the process target table (Y) has a post-target-position table (Z), and further a post-insert-position table (B) and the process target table (Y) are not adjacent to each other, the second sort processing unit changes an indication of a front pointer of the post-insert-position table (B) to the process target table (Y), changes an indication of a back pointer of a pre-target-position table (X) to the post-target-position table (Z), changes an indication of a front pointer of the process target table (Y) to a link front end (NULL) and an indication of a back pointer thereof to the post-insert-position table (B), and further changes an indication of a front pointer of the post-target-position table (Z) to the pre-target-position table (X).

(Sixth Case)

In a sixth case where, as the three conditions, a pre-insert-position table (A) is not present, the process target table (Y) has a post-target-position table (Z), and further a post-insert-position table (B) and the process target table (Y) are adjacent to each other, the second sort processing unit changes an indication of a front pointer of the post-insert-position table (B) to the process target table (Y) and an indication of a back pointer thereof to the post-target-position table (Z).

changes an indication of a front pointer of the process target table (Y) to a link front end (NULL) and an indication of a back pointer thereof to the post-insert-position table (B), and further changes a front pointer of the post-target-position table (Z) to the post-insert-position table (B).

(Seventh Case)

In a seventh case where, as the three conditions, a pre-insert-position table (A) is not present, the process target table (Y) does not have a post-target-position table (Z), and further a post-insert-position table (B) and the process target table (Y) are not adjacent to each other, the second sort processing unit changes an indication of a front pointer of the post-insert-position table (B) to the process target table (Y), changes an indication of a back pointer of a pre-target-position table (X) to a link rear end (NULL), and further changes an indication of a front pointer of the process target table (Y) to a link front end (NULL) and an indication of a back pointer thereof to the post-insert-position table (B).

(Eighth Case)

In an eighth case where, as the three conditions, a pre-insert-position table (A) is not present, the process target table (Y) does not have a post-target-position table (Z), and further a post-insert-position table (B) and the process target table (Y) are adjacent to each other, the second sort processing unit changes an indication of a front pointer of the post-insert-position table (B) to the process target table (Y) and an indication of a back pointer thereof to a link rear end (NULL), and further changes an indication of a front pointer of the process target table (Y) to a link front end (NULL) and an indication of a back pointer thereof to the post-insert-position table (B).

The hierarchical storage system of the present invention sequentially performs the processes of the restore processing unit, the first sort processing unit, and the second sort processing unit during an initialization process from a power-on again until the input/output process is performed.

When the link reconfiguration is not completed until the input/output process starts, the second sort processing unit repeats processes of suspending a sort process at the start of the input/output process, resuming the sort process at every predetermined time after the start of the input/output process, and then suspending the sort process after a predetermined time.

The link generated and managed by the link managing unit is any one of:

a hit link connecting, in time-stamp order, block information tables of synchronized data blocks residing both in the primary storage and the secondary storage;

a dirty link connecting, in time-stamp order, block information tables of data blocks residing in the primary storage but not residing in the secondary storage or data blocks residing therein but are not synchronized; or an LRU link connecting, in time-stamp order, block information tables of all data blocks residing in the primary storage.

In another embodiment of the present invention, a link sort apparatus is provided. The link sort apparatus of the present invention includes:

a first sort processing unit that classifies a plurality of information tables each having a time stamp randomly stored on a memory into group-specific links of a plurality of time zones and then connects the group-specific links in time-stamp order to form a group classification link; and a second sort processing unit that sequentially retrieves the information tables of the group classification link from an earliest time stamp side for insertion in a position so as to achieve a time-stamp ascending order to configure a link.

Here, the first sort processing unit of the link sort apparatus the first sort processing unit generates a plurality of group-specific links by dividing a time period from an earliest time stamp to a latest time stamp obtained through a search from the restored block information tables into a predetermined number of time zones, retrieves one of the information tables in address order and inserts the block information table in one of the group-specific links to which a time stamp belongs for connection in address order, and connects the group-specific links in temporal order after grouping to form the group classification link.

(Method)

The present invention provides a hierarchical storage control method. A hierarchical storage apparatus targeted by the present invention includes:

a hierarchical storage unit formed of a primary storage using a high-speed, small-capacity storage apparatus and a secondary storage using a low-speed, large-capacity storage apparatus, with the primary storage being used as a cache apparatus of the secondary storage, a block information table managing unit that generates, when a data block is written in the primary storage, a block information table on a volatile memory for management, the block information table having stored therein a time stamp, and writes a group of block information tables on the volatile memory in the primary storage in each predetermined timing for storage;

a link managing unit that generates, when the block information table is generated, a link on the volatile memory, the link having the block information table inserted in a position so as to achieve a time-stamp order and connected by pointers, and generates a link table having stored therein the pointers for management on the volatile memory; and an input/output processing unit that performs an input/output process of the hierarchical storage unit based on a mapping check upon reception of an input/output request of a data block from a higher-level apparatus.

A method of controlling such a hierarchical storage system according to the present invention includes:

a restore processing step of restoring the block information tables from the primary storage to the volatile memory at power-on again;

a first sort processing step of classifying the restored block information tables into group-specific links of a plurality of time zones and then forming a group classification link by connecting group-specific links in temporal order; and a second sort processing step of sequentially retrieving block information tables of the group-specific links from an earliest time stamp side for insertion in a position so as to achieve a time-stamp ascending order to reconfigure the link.

In another embodiment of the present invention, a link sort method is provided. The link sort method of the present invention includes:

a first sort processing step of classifying a plurality of information tables each having a time stamp randomly stored on a memory into group-specific links of a plurality of time zones and then connecting the group-specific links in time-stamp order to form a group classification link; and a second sort processing step of sequentially retrieving the information tables of the group classification link from an earliest time stamp side for insertion in a position so as to achieve a time-stamp ascending order to configure a link.

(Program)

The present invention provides a control program to be executed by a computer of a hierarchical storage system.

The hierarchical storage system including a computer that executes the program of the present invention includes:

a hierarchical storage unit formed of a primary storage using a high-speed, small-capacity storage apparatus and a secondary storage using a low-speed, large-capacity storage apparatus, with the primary storage being used as a cache apparatus of the secondary storage, a block information table managing unit that generates, when a data block is written in the primary storage, a block information table on a volatile memory for management, the block information table having stored therein a time stamp, and writes a group of block information tables on the volatile memory in the primary storage in each predetermined timing for storage;

a link managing unit that generates, when the block information table is generated, a link on the volatile memory, the link having the block information table inserted in a position so as to achieve a time-stamp order and connected by pointers, and generates a link table having stored therein the pointers for management on the volatile memory; and an input/output processing unit that performs an input/output process of the hierarchical storage unit based on a mapping check upon reception of an input/output request of a data block from a higher-level apparatus.

The control program of the present invention causes a computer of such a hierarchical storage system to execute steps including:

a restore processing step of restoring the block information tables from the primary storage to the volatile memory at power-on again;

a first sort processing step of classifying the restored block information tables into groups of a plurality of time zones and then forming a group classification link by connecting the groups in time-stamp order; and a second sort processing step of sequentially retrieving block information tables of the group-specific links from an earliest time stamp side for insertion in a position so as to achieve a time-stamp ascending order to reconfigure the link.

In another embodiment of the present invention, a link sort program is provided. The link sort program of the present invention causes a computer to execute steps including:

a first sort processing step of classifying a plurality of information tables each having a time stamp randomly stored on a memory into group-specific links of a plurality of time zones and then connecting the group-specific links in time-stamp order to form a group classification link; and a second sort processing step of sequentially retrieving the block information tables (the information tables) of the group classification link from an earliest time stamp side for insertion in a position so as to achieve a time-stamp ascending order to configure a link.

Here, details of the method and the program according to the present invention are basically identical to those in the case of the system and the apparatus according to the present invention.

According to the present invention, at power-on again, two steps of sort processes are performed, that is, the first sort process of generating a group classification link from block information tables of the stored data blocks as a backup restored on the memory from the primary storage and the second sort process of arraying the group classification link in time-stamp order. With this, even if the number of block information tables to be disposed on a link is large, for example, hundreds of thousands, a link arrayed in time-stamp order can be reconfigured on the memory during an initialization process within a short period of time, such as the order of several minutes, from power-on again until an input/output process starts. That is, in the first sort process serving as a first stage, for the block information tables listed on the memory, group-specific links of a plurality of time ranges obtained by dividing a time period defined by the earliest (LRU) and latest (MRU) time stamps are formed, and a block information table belonging to the time range of each group is inserted in the relevant group-specific link for connection in address order. Thus, in the second sort process serving as a second stage, an insert sort process can be executed only within the range of each group-specific link. Therefore, a search range of the arrayed link at the time of insertion and sorting for comparison between time stamps and determination of a relation in magnitude therebetween is suppressed to a group-specific-link length at maximum, thereby reducing the time required for searching the arrayed link. Thus, a link reconfiguration processing time can be reduced to a practical time within which link reconfiguration can be completed during an initialization process. Therefore, even if the link generated on the volatile memory is lost due to a system power shutdown, the block information tables stored as a backup can be restored at power-on again to reconfigure an accurate link arrayed in time-stamp order. With an input/output process using the reconfigured link, an input/output performance equivalent to that before the power shutdown can be achieved immediately after power-on again. Furthermore, in the second sort process serving as the second stage for the group classification link, three conditions are specified as link states with different pointer connections, and insert sort process algorithms for eight cases are pre-set. When a process target and its insert position are specified, these three conditions are established to determine a case, and thus insertion and sorting is performed. With this, efficiency of performing an insert sort process is significantly increased, thereby reducing a processing time required for link reconfiguration. The above and other objects, features, and advantages of the present invention will become more apparent from the following detailed description with reference to the drawings.

BRIEF DESCRIPTION OF THE DRAWINGS

FIGS. 1A and 1B are drawings for describing a petabyte hierarchical storage system to which the present invention is applied;

FIG. 4 is a drawing for describing the hierarchical storage system;

FIG. 5 is a drawing for describing a data transfer process in the hierarchical storage system;

FIG. 10 is a drawing for describing a block information table in the present invention;

FIG. 11 is a drawing for describing a link table in the present invention;

FIG. 14 is a flowchart of a read process in the present invention;

FIG. 15C is a drawing for describing the first sort process continued from FIGS. 15A and 15B;

DETAILED DESCRIPTION OF THE PREFERRED EMBODIMENTS

FIGS. 1A and 1B are drawings of a petabyte hierarchical storage system to which the present invention is applied. In FIGS. 1A and 1B, a petabyte hierarchical storage system 10 constructs a storage system having a petabyte (=103 terabytes) class capacity by using a data hierarchical configuration with a primary storage and a secondary storage. The petabyte hierarchical storage system 10 is provided with, in this example, an experiment data management server 12-1, a document data management server 12-2, and an image data management server 12-3 via fiber channel switches 14-1 and 14-2 as higher-level apparatuses at a host side, and performs an input/output process for each server. The petabyte hierarchical storage system 10 is provided with a disk array apparatus 16 as a primary storage, and tape libraries 18-1 and 18-2 and optical disk libraries 20-1 and 20-2 as a secondary storage. The disk array apparatus 16 as the primary storage has a storage capacity of 2 terabytes, for example, and the tape libraries 18-1 and 18-2 and the optical disk libraries 20-1 and 20-2 as the secondary storage form the remaining capacity. Between the disk array apparatus 16 as the primary storage and the tape libraries 18-1 and 18-2 and the optical disk libraries 20-1 and 20-2 as the secondary storage, hierarchical control servers 24-1 and 24-2 are disposed for interhierarchical data transfer, which are connected to the disk array apparatus 16 via fiber channel switches 22-1 and 22-2 and are connected to the tape libraries 18-1 and 18-2 and the optical disk libraries 20-1 and 20-2 via fiber channel switches 25-1 and 25-2. Furthermore, for maintenance processing of the petabyte hierarchical storage system 10, a maintenance terminal 26 is connected via a LAN.

Figure 2:
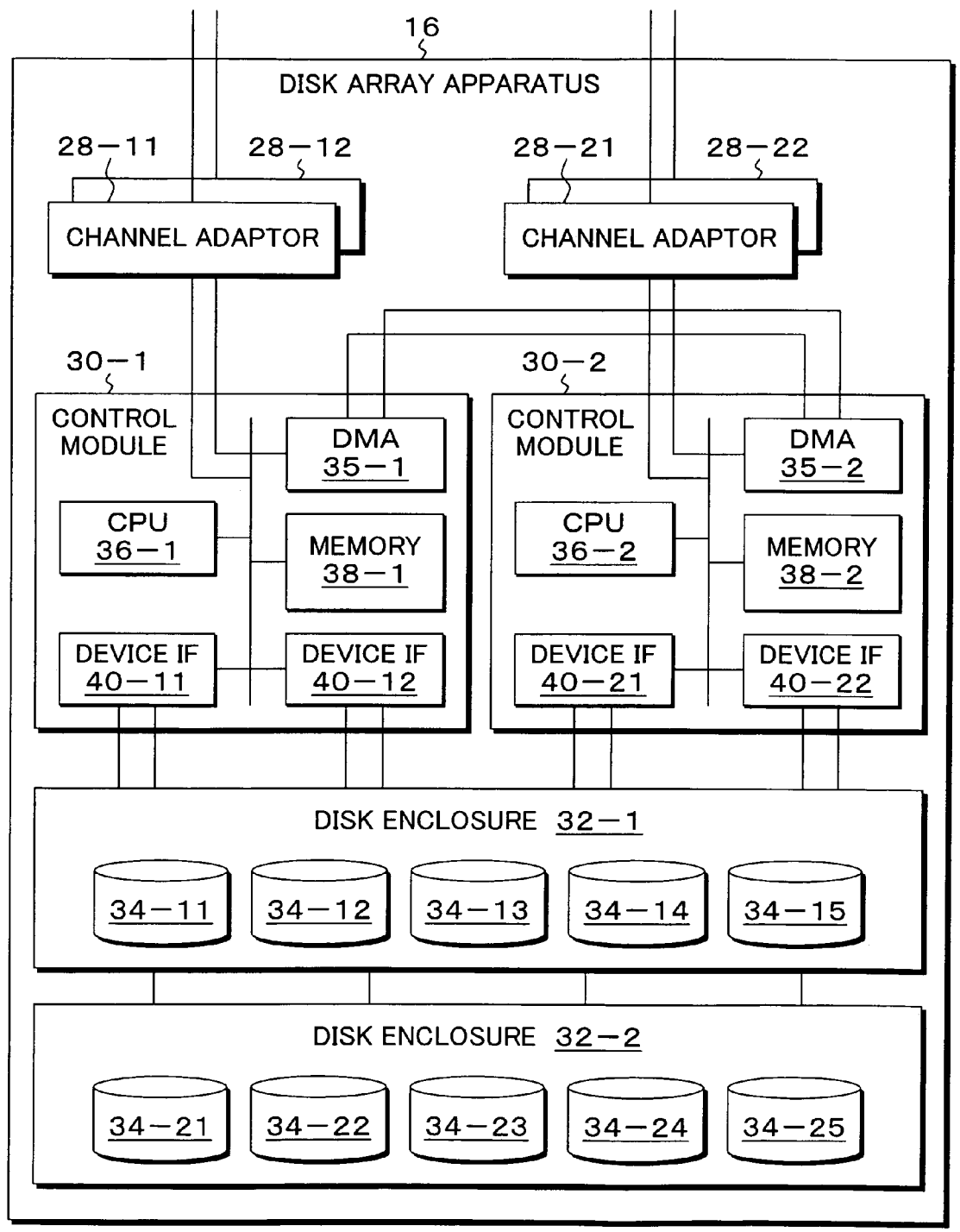
FIG. 2 is a block diagram of a hardware configuration of a disk apparatus of FIGS. 1A and 1B.

FIG. 2 is a block diagram of a hardware configuration of the disk array apparatus 16 disposed as the primary storage in FIGS. 1A and 1B. In FIG. 2, the disk array apparatus 16 is provided with two systems of channel adaptors 28-11, 28-12 and channel adaptors 28-21 and 28-22 to which various servers are connected as shown in FIGS. 1A and 1B. The disk array apparatus 16 is also provided with redundant control modules 30-1 and 30-2. The control modules 30-1 and 30-2 are provided with disk enclosures 32-1 and 32-2, each disk enclosure including fifteen disk apparatuses. Here, in FIG. 2, five of these disk apparatuses are shown, that is, magnetic disk apparatuses 34-11 to 34-15 and magnetic disk apparatuses 34-21 to 34-25. The five magnetic disk apparatuses 34-11 to 34-15 of the disk enclosure 32-1 form a disk array with a RAID configuration having a predetermined RAID level such as RAID 1 or RAID 5, and so do the five magnetic disk apparatuses 34-21 to 34-25 of the disk enclosure 32-2. The control modules 30-1 and 30-2 are provided with CPUs 36-1 and 36-2, respectively, DMA controllers 35-1 and 35-2, respectively, memories 38-1 and 38-2, respectively, device interfaces 40-11 and 40-12 and device interfaces 40-21 and 40-22, respectively.

Figure 3:
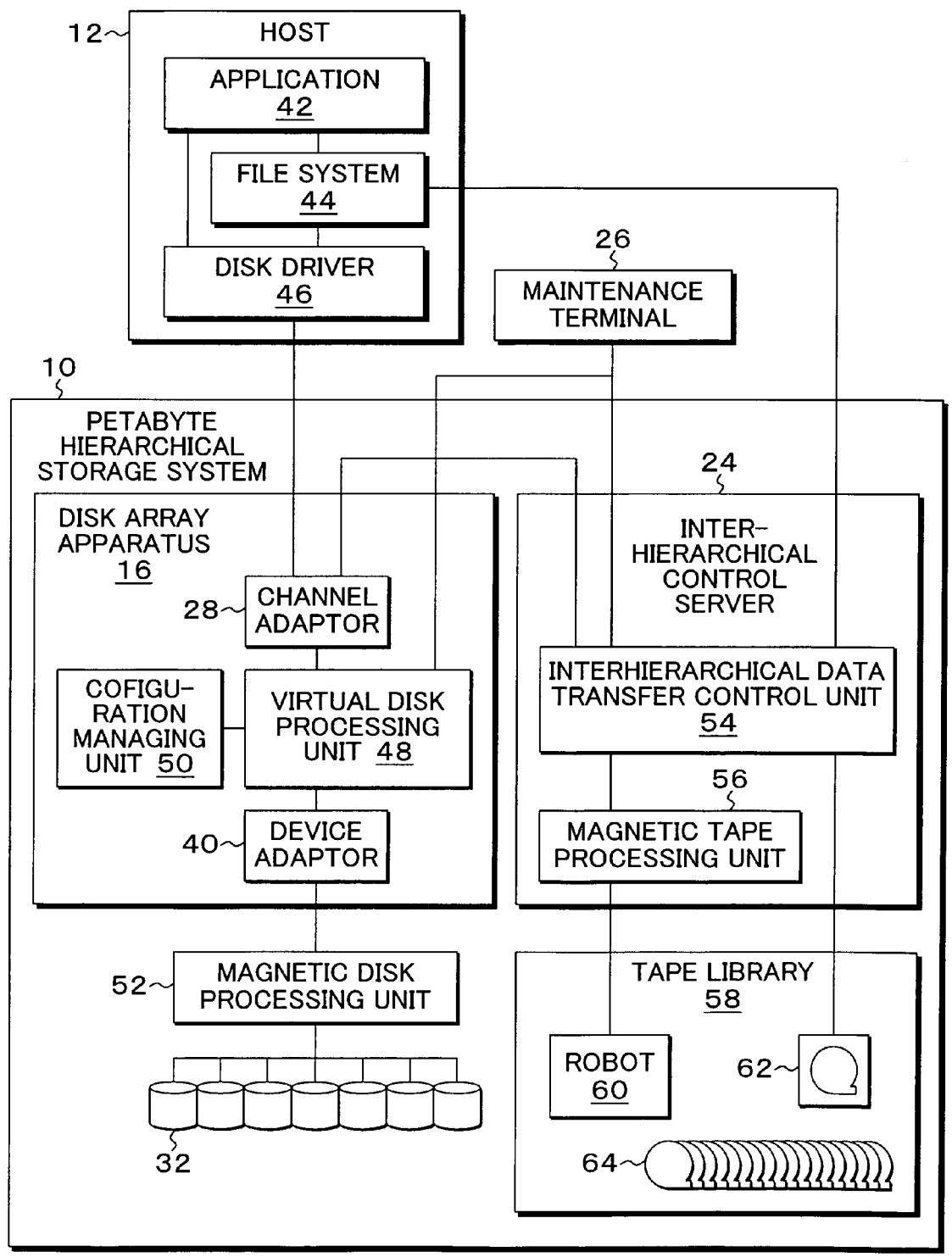
FIG. 3 is a drawing for describing a software configuration in the petabyte hierarchical storage system of FIGS. 1A and 1B.

FIG. 3 is a drawing for describing a software configuration in the petabyte hierarchical storage system 10 of FIGS. 1A and 1B. In FIG. 3, a host 12 is provided with an application 42, a file system 44, and a disk driver 46 operating on a predetermined OS. The disk array apparatus 16 of the petabyte hierarchical storage system 10 is provided with a virtual disk processing unit 48 and a configuration managing unit 50. The virtual disk processing unit 48 is connected to the host 12 via a channel adaptor 28 and is connected to a disk array 32 including a magnetic disk processing unit 52 via a device adaptor 40. The virtual disk processing unit 48 and the configuration managing unit 50 of the disk array apparatus 16 are functions achieved through execution of a program by, for example, the CPU 36-1 of the control module 30-1 at the master side provided to the disk array apparatus 16 shown in FIGS. 15A and 15B. Also, an interhierarchical control server 24 provided to the petabyte storage system 10 is provided with an interhierarchical data transfer control unit 54 and a magnetic tape processing unit 56. The magnetic tap processing unit 56 is provided with a library mechanism unit 58, and the library mechanism unit 58 is provided with a robot 60, a tape drive 62 and cartridge tapes 64. A robot 60 moves upon receipt of a move command from the interhierarchical data transfer control unit 54 to perform a tape transferring process for transferring a cartridge tape 64 from an accommodation rack into the tape drive 62 and dismounting a processed cartridge tape from the tape drive 62 for return to the accommodation shelf. The virtual disk processing unit 48 of the disk array apparatus 16 is connected to the magnetic tape processing unit 56 via the interhierarchical data transfer control unit 54 of the interhierarchical control server 24. The interhierarchical data transfer control unit 54 performs data transfer in association of an input/output process from the host 12 between the disk array apparatus 16 as the primary storage and the tape library 58 as the secondary storage. Also, the maintenance terminal 26 is connected to the petabyte hierarchical storage system 10 via the LAN.

FIG. 4 is a drawing for describing a data hierarchical configuration in the hierarchical storage system to which the present invention is applied. In FIG. 4, in the data hierarchical configuration constructed by the present invention, the host 12 is positioned at the top. For the host 12, for example, a file system 44 is disposed as an OS. At a lower side of this host 12, a hierarchical storage 15 including a primary storage 68 and a secondary storage 70 is disposed. Based on the characteristic in which some data is accessed by the host 12 at a high frequency and others at a low frequency, the hierarchical storage 15 has a configuration in which data at a higher frequency of access is placed in the primary storage 68 that is closer to the host 12 and uses, for example, a magnetic disk apparatus, which is high in price and performance, and data at a lower frequency of access is placed in the secondary storage 70 that is away from the host 12 and uses, for example, a magnetic tape apparatus, which is low in price and performance. In the hierarchical storage system of the present invention, user data is hierarchically disposed in the primary storage 68 and the secondary storage 70, and the data hierarchy management mechanism and the virtual disk mechanism by the configuration managing unit 50 provide a disk space equivalent to the capacity of the secondary storage 70 through a normal disk access interface in the host 12. Also, when such a hierarchical storage system is viewed from the host 12, the primary storage 68 functions as a cache apparatus for the secondary storage 70. Therefore, by generating and managing a mapping table for mapping into the primary storage 68, a hit decision is made for an input/output request from the host 12, and an input/output process corresponding to the decision result is performed. This input/output process can be divided into a write process and a read process. In the write process, if a hit with respect to an access from the host 12 is present, data is written in the primary storage 68. In the case of a mishit, after writing in the primary storage 68, synchronization with the secondary storage 70 is taken as required. On the other hand, in the read process, if a hit is present, data is read from the primary storage 68 for response. In the case of a mishit, after staging data from the secondary storage 70 to the primary storage 68, a hit state is caused to make a read response. Here, with regard to data exchanges between the primary storage 68 and the secondary storage 70, staging data from the secondary storage 70 to the primary storage 68 to cause a hit state is referred to as recall. Also, writing data updated on the primary storage 68 in the secondary storage 70 and synchronizing the data contents between the primary storage 68 and the secondary storage 70 is referred to as synchronization (Sync), which corresponds to writeback in normal cache apparatuses. Also, synchronizing (Sync) the data contents between the primary storage 68 and the secondary storage 70 and then further deleting the data contents on the primary storage 68 is referred to as migration. Furthermore, the virtual disk mechanism in the hierarchical storage system of the present invention provides a disk space more than a physical disk capacity of the primary storage 68 by showing the host 12 a large-capacity storage area of the secondary storage 70 as a virtual disk space. In this case, the host is not directly connected to the secondary storage 70. A logical disk (logical volume) shown to the host 12 by using such a virtual disk configuration is referred to as a VLU (virtual logical unit). The total capacity of logical disks definable in this hierarchical storage system can be more than the physical capacity of the primary storage 68, but cannot be more than the capacity of the secondary storage 70.

FIG. 5 is a drawing for describing data transfer in the hierarchical storage system of the present invention. In FIG. 5, data transfer through recall or sync/migration between the primary storage 68 and the secondary storage 70 is performed in predetermined units of data block. For this reason, a virtual logical unit 72, that is, a logical volume, of the primary storage 68 is formed of one or plurality of data blocks. As for the secondary storage 70, one cartridge tape is divided into a plurality of data blocks. In the case of a mishit in the primary storage 68 for a read request from the host 12, a corresponding data block is staged from the secondary storage 70 to a virtual logical unit 72 to cause a hit state, and then a read response is made to the host 12. For a write command from the host 12, in the case of a hit in a virtual logical unit in the primary storage 68, a data block is newly written or updated on the primary storage 68, and then sync or migration is performed for transferring to the secondary storage 70 in a desired timing for synchronization.

Figure 6A:
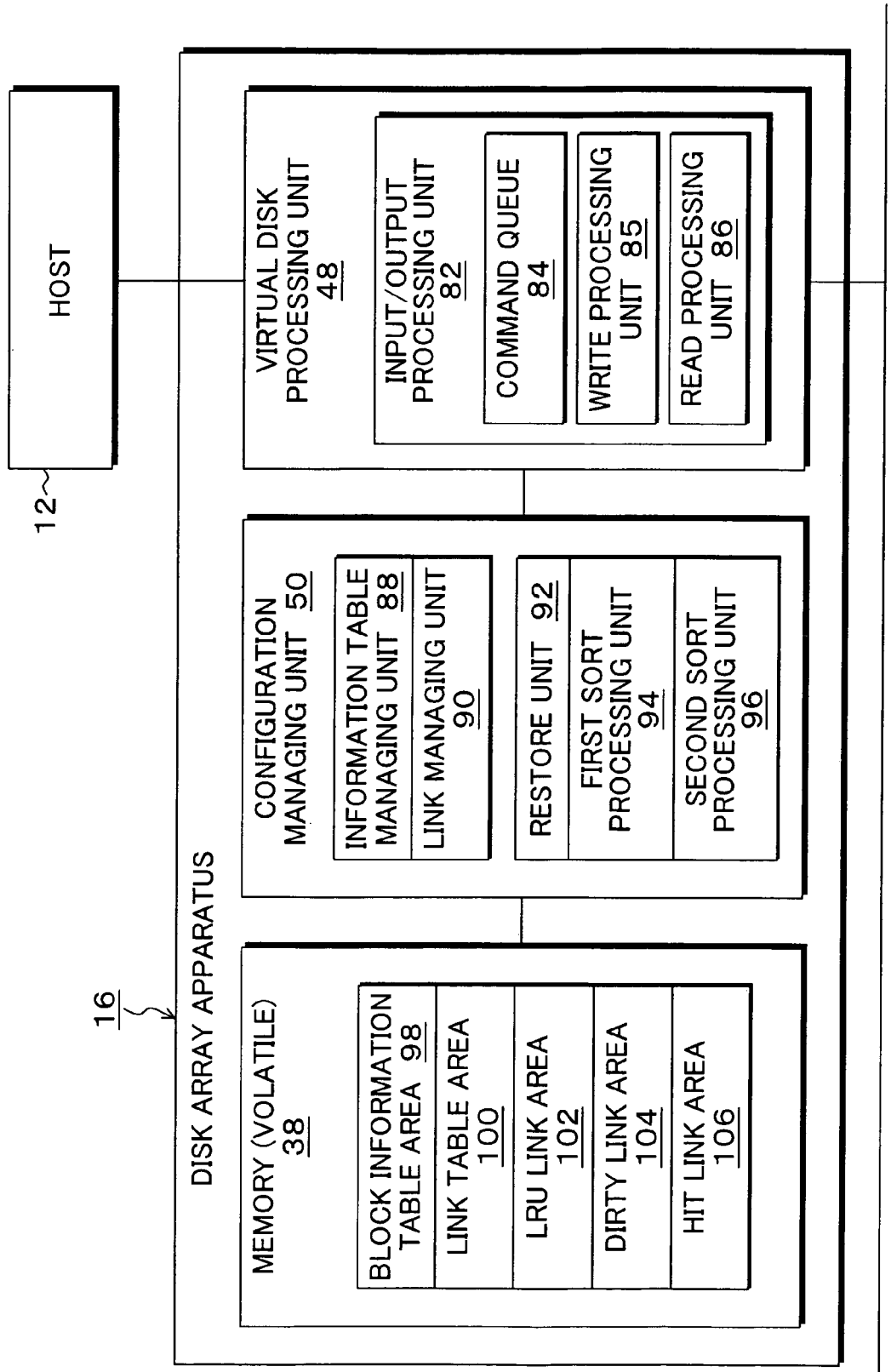
FIGS. 6A and 6B are drawings for describing a functional configuration according to the present invention.
Figure 6B:
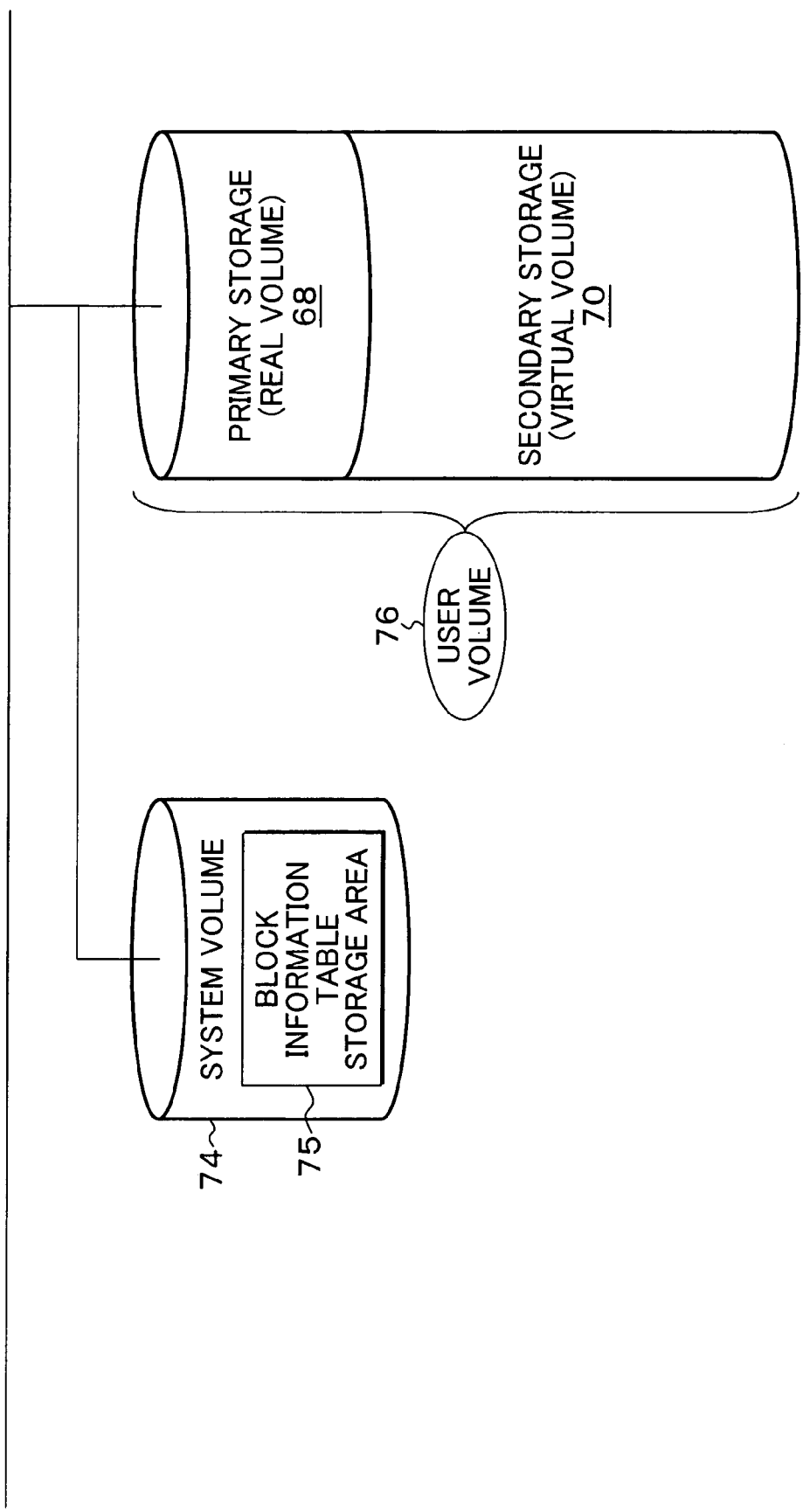

FIGS. 6A and 6B are drawings for describing a functional configuration of the hierarchical storage system according to the present invention. In FIGS. 6A and 6B, a function of the virtual disk apparatus for controlling the data hierarchical configuration is achieved by the virtual disk processing unit 48 and the configuration managing unit 50 of the disk array apparatus 16. For the virtual disk processing unit 48, the primary storage 68 formed of real volumes and the secondary storage 70 formed of virtual volumes are disposed as a user volume 76 based on a data hierarchical configuration. Also, the virtual disk processing unit 48 is provided with a system volume 74 for storing various control information required for virtual disk control. The virtual disk processing unit 48 is provided with an input/output processing unit 82, and the input/output processing unit 82 is provided with a command queue 84, a write processing unit 85, and a read processing unit 86. Also, the configuration managing unit 50 is provided with an information table managing unit 88 and a link managing unit 90. In addition, in the present invention, a restore unit 92, a first sort processing unit 94, and a second sort processing unit 96 are provided for use in reconfiguring a table link when the power of the system is shut down and then power is on again. A volatile memory 38 is provided with a block information table area 98, a link table area 100, an LRU link area 102, a dirty link area 104, and a hit link area 106 corresponding to an input/output process of the virtual disk processing unit 48. The information table managing unit 88 provided in the configuration managing unit 50 generates, for each data block, a block information table and a link table and manages them on the memory 38. The block information table retains a status of the data block, corresponding VLU (virtual logical unit) information, disk position information, time stamp information, and others. The link table retains various link information and information for host input/output control. When a data block is written in the primary storage 68 through a process of the write processing unit 85, the information table managing unit 88 generates a block information table having stored therein a time stamp having a value corresponding to a write time, and then stores the block information table in the block information table area 98 of the memory 38. With such generation and storing of the block information table by the information table managing unit 88, block information tables as many as the data blocks of the user data disposed in the primary storage 68 are stored in the block information table area 98 of the memory 38. The memory 38 is a volatile memory, and its storage contents are lost when power is shut down. Therefore, in the present invention, a backup process is performed for periodically storing data of the block information table area 98 of the memory 38 in a block information table storage area 75 of the system volume 74 in predetermined timings. The timings of backing-up the block information table area 98 include, for example:

(1) at the time of new mapping;
(2) at the time of changing a data block state; and
(3) at the time of unmapping. When a block information table is generated on the block information table area 98 of the memory 38, the link managing unit 90 provided in the configuration managing unit 50 generates a link in which the block information table is inserted in a link corresponding to a status at a position so as to achieve a time stamp order and is connected by pointers, and also generates a link table having stored therein pointers for connecting the like to tables and then storing the link table in the link table area 100. As links to be used in the present embodiment by the virtual disk processing unit 48, there are three links as follows:

(1) an LRU link;
(2) a dirty link; and
(3) a hit link.

Correspondingly, the memory 38 is provided with the LRU link area 102, the dirty link area 104, and the hit link area 106. Here, the hit link is a link connecting, in time-stamp order, block information tables of synchronized data blocks residing both in the primary storage 68 and the secondary storage 70. Also, the dirty link is a link connecting, in time-stamp order, block information tables of blocks residing in the primary storage 68 but not in the secondary storage 70 or blocks residing therein but are not synchronized. Furthermore, the LRU link is a link connecting, in time-stamp order, block information tables of all data blocks residing in the primary storage 68. The hit link, the dirty link, and the LRU link are used for allowing autonomous data re-disposition and operation between the primary storage 68 and the secondary storage 70 depending on the frequency of data access and requirements. The hit link is used for allocating a free area for data blocks in the primary storage 68. When new mapping occurs with the remaining free area being decreased or with no free area, a necessary table is retrieved from the earliest side, that is, the LRU side, of time stamps in the hit link, and then its corresponding data block is deleted from the primary storage 68, thereby allocating a free area. The status of the block information table of the deleted data block is changed to a miss state (a non-mapping state) and therefore a process of excluding the information table from the hit link is performed. On the other hand, when a dirty rate of data blocks in the primary storage 68, that is, a ratio of data blocks not synchronized with those in the secondary storage 70, is increased, the dirty link is used for a process for synchronization (Sync) to increase a hit rate by decreasing the dirty rate. Specifically, the dirty rate in the primary storage (real volume) 68 is monitored, and when the dirty rate exceeds a predetermined value, a predetermined number of tables are retrieved from the earliest side, that is, the LRU side, of time stamps in the dirty link, and then their corresponding data blocks are data-transferred from the primary storage 68 to the secondary storage 70 for writing therein, thereby achieving synchronization. The status of the block information table of the synchronized data blocks is changed to a hit state, and therefore a process of excluding the information tables from the dirty link and reconnecting them to the hit link is performed. As for the LRU link, for example, if a time to transfer from the primary storage 68 to the secondary storage 70, such as "transfer all data three years previous to this year", is set, data blocks of block information tables having time stamps corresponding to this setting are transferred from the primary storage 68 to the secondary storage 70. Thus, these data blocks, block information tables, and link tables in the primary storage 68 are deleted. In an operation state of the hierarchical storage system of the present invention, the LRU link, the dirty link, and the hit link disposed on the memory 38 each have a link arrangement in which block information tables are connected in time-stamp order by pointers of the link table with the earliest coming at the LRU side and the latest coming at the MRU side. During an initialization process for shutting down the power of the hierarchical storage system of the present invention and then powering on again to start an input/output process of the system, the restore unit 92, the first sort processing unit 94, and the second sort processing unit 96 provided in the configuration managing unit 50 perform a process of restoring to the memory 38 the block information tables of the LRU link, the dirty link, and the hit link lost from the memory 38 by power shutdown, which have been stored in the table storage area 75 of the system volume 74 through a backup process, for reconfiguration. At system power-on again, the restore unit 92 restores, to the block information table area 98 of the memory 38, the block information tables before power shutdown stored as a backup in the block information table storage area 75 of the system volume 74. The first sort processing unit 94 generates sixteen group-specific links through a division, into time zones, of a time period from the earliest (LRU) time stamp to the latest (MRU) time stamp retrieved from the block information tables restored in the memory 38, retrieves the block information tables restored in the memory 38 in address order and inserts them in relevant group-specific links of their time zones for connection in address order and, after this grouping is completed, connects the group-specific links in temporal order to configure a group classification link. The second sort processing unit 96 sequentially retrieves the block information tables in the group classification link generated in the first sort processing unit 94 from the earliest time stamp side for insertion in a position so as to achieve a time-stamp ascending order, thereby reconfiguring the links. This reconfiguration of the LRU link, the dirty link, the hit link by the restore unit 92, the first sort processing unit 94 and the second sort processing unit 96 is assumed to be completed during the initialization process from system power-on again to a start of a process by the input/output processing unit 82. However, if the initialization process is not completed, a sort process is suspended at the stage of starting an input/output process as a process of the second sort processing unit 96, and then a timer interrupt is performed at predetermined time intervals during an operation in which the input/output process is being performed. During a predetermined time period of a timer interrupt, the process of the second sort processing unit 96 is repeated so as to complete a link reconfiguration process at an early stage of a system operation.

Figure 7:
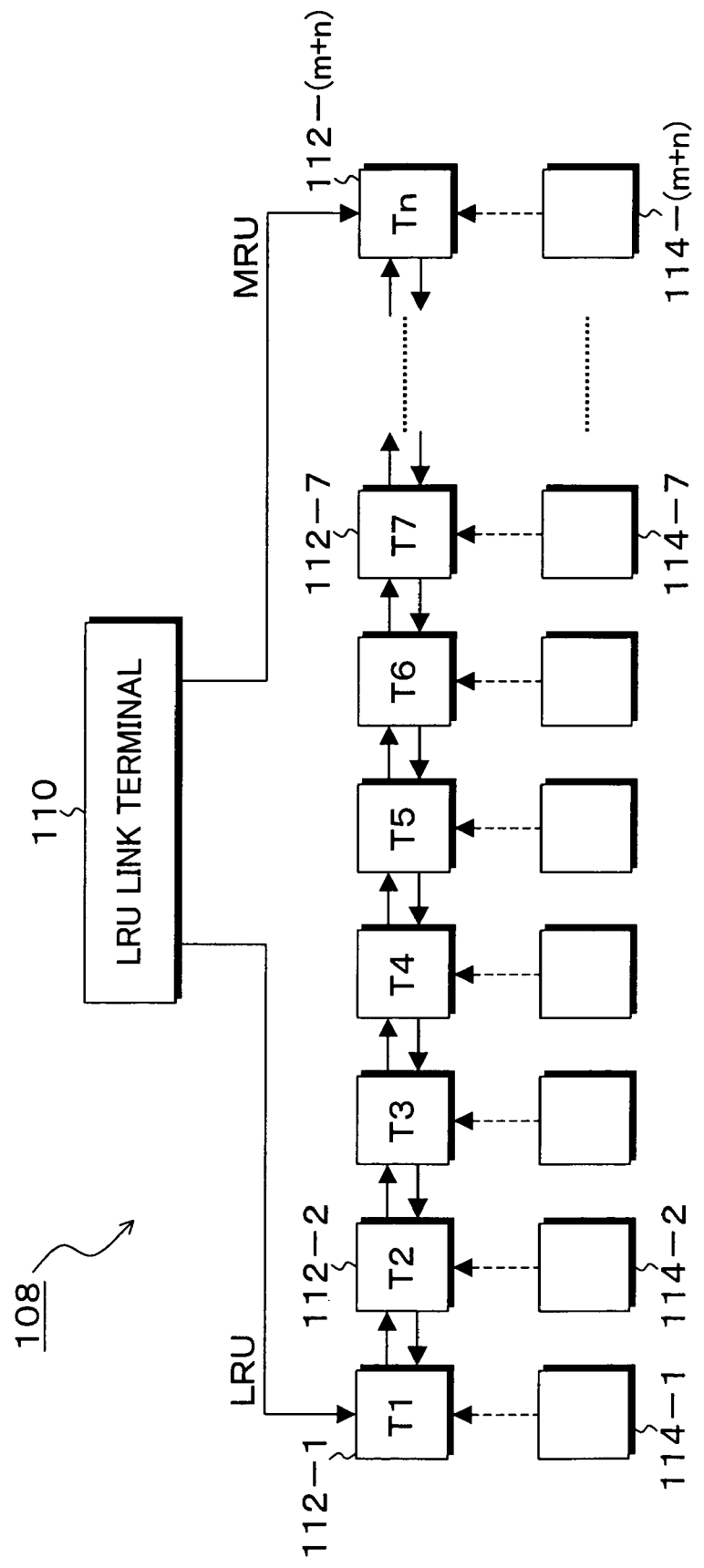
FIG. 7 is a drawing for describing a LRU link in the present invention.

FIG. 7 is a drawing for describing the LRU link in the present invention. In FIG. 7, an LRU link 108 has arrayed to a LRU link terminal 110 a plurality of block information tables 112-1 to 112-($m+n$) between the LRU side (the earliest side) to the MRU side (the latest side) in time-stamp order, such as time stamps T1, T2, T3, . . . , Tm+n. The block information tables 112-1 to 112-($m+n$) forming the LRU link 108 forming the LRU link 108 each have set forward at the LRU side a front pointer represented by an arrow and each have set backward at the MRU side a back pointer represented by an arrow, thereby specifying addresses of the block information tables positioned at both sides. Furthermore, values of the pointers connecting, in time-stamp order, the block information tables 112-1 to 112-($m+n$) forming the LRU link 108 forming the LRU link 108, that is, values of the front pointers and the back pointers, are stored in link tables 114-1 to 114-($m+n$) generated correspondingly to the block information tables 112-1 to 112-($m+n$).

Figure 8:
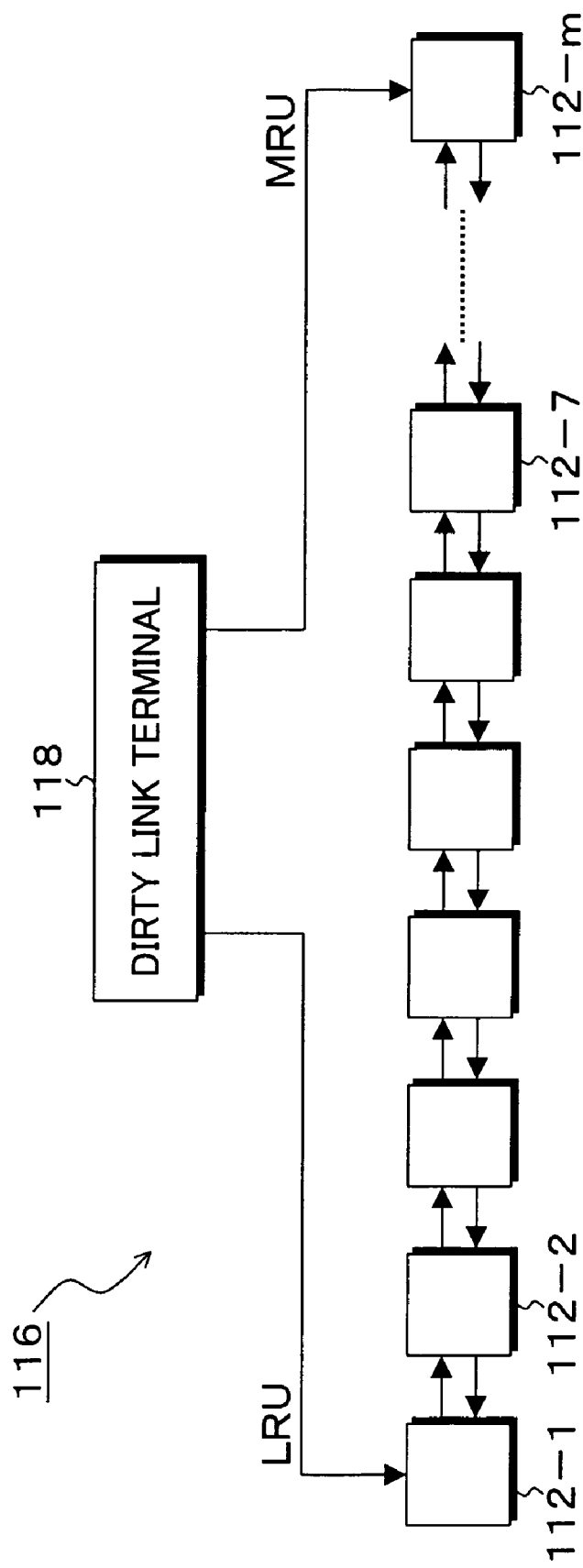
FIG. 8 is a drawing of a dirty link in the present invention.

FIG. 8 is a drawing for describing a dirty link 116 in the present invention. In FIG. 8, the dirty link 116 is formed of a dirty link terminal 118 and the block information tables 112-1 to 112-$n$ arrayed in time-stamp order between the LRU side and the MRU side. The block information tables 112-1 to 112-$n$ are connected by front pointers and back pointers represented by arrows forming the link, and these pointers are stored in the link tables 114-1 to 114-$n$ shown in FIG. 7.

Figure 9:
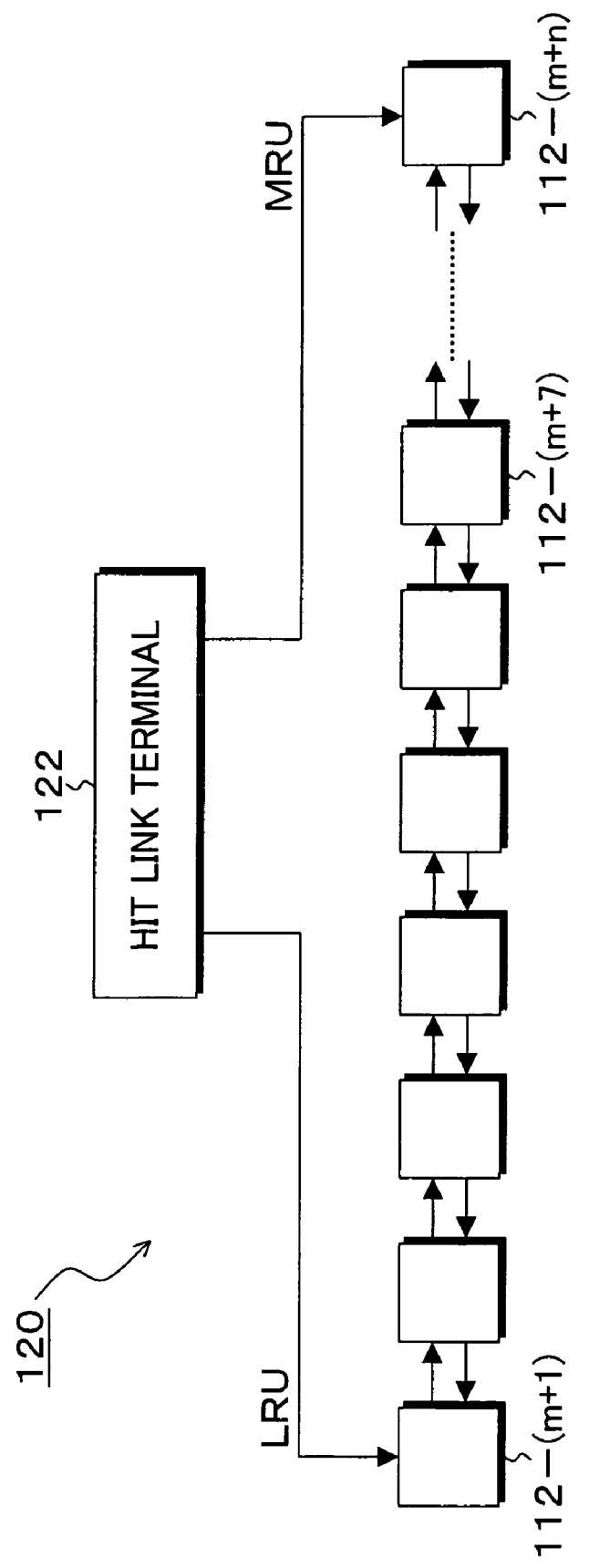
FIG. 9 is a drawing for describing a hit link in the present invention.

FIG. 9 is a drawing for describing a hit link 120 in the present invention, and the hit link 120 is formed of a hit link terminal 112 and the block information tables 114-($m+1$) to 114-($m+n$) arrayed in time-stamp order between the LRU and the MRU. Front pointers and back pointers for link formation of the hit link 112 are also stored in the link tables 114-($m+1$) to 114-($m+n$) shown in FIG. 7.

FIG. 10 is a block information table in the present invention. In FIG. 10, a block information table 112 is a table having a 64-byte size, for example, and has stored therein information shown in the following (1) to (15).

(1) An index number of the block information table.

(2) A valid/invalid flag, and a valid flag is represented as 0x01 and 0x00.

(3) A volume table contents (VTOC) information flag indicating whether the VTOC is a block information table.

(4) A status of the data block is specified.

0x00 represents that mapping has not been performed on a disk.

0x01 represents that mapping has been performed but data has not been staged.

0x02 represents a hit state where the data contents in the primary storage are identical to those in the secondary storage.

0x04 represents a dirty state where the data contents in the primary storage are different from those in the secondary storage.

0x10 represents that a data information block removed at the time of closing an LRU link is in a dirty state.

0x20 represents that a synchronization process has failed.

(5) A flag retaining a bind state, indicating whether the bind state is valid or invalid.

(6) A unit size of the data block is indicated.

(7) A data block allocation starting address on the real disk is indicated.

(8) A real disk number is indicated.

(9) A virtual logical unit number is indicated.

(10) A data block number on the virtual logical unit is indicated.

(11) An allocation control module number is indicated.

(12) A role control module number is indicated.

(13) Time stamp information is indicated.

(14) A synchronization control flag is indicated.

(15) Reserved.

In the above-described block information table 112, a data block status 124 in the above (4) and time stamp information 126 in the above (13) are mainly required for link reconfiguration at power-on again according to the present invention.

FIG. 11 is a drawing for describing the link table in the present invention. In FIG. 11, a link table 114 has a table size of 96 bytes, for example. The contents of the link table 114 are shown in the following (1) to (23).

(1) An index number of the link table is indicated (2) A pointer of an upper management table is indicated.

(3) A pointer to a block information table is indicated.

(4) A pointer to a real disk management buffer is indicated.

(5) Previous/subsequent information (front pointer/back pointer) about the hit link/dirty link is indicated.

(6) Previous/subsequent information (front pointer/back pointer) about the LRU link is indicated.

(7) Previous/subsequent information about the virtual logical unit link is indicated.

(8) Previous/subsequent information about the real logical unit link is indicated.

(9) Header/tail information about the free link is indicated.

(10) Previous/subsequent information about the free link is indicated.

(11) A block exclusive flag is indicated.

(12) A time stamp information synchronization flag, which sets whether table synchronization between control modules is required.
(13) A delete reservation flag is indicated.
(14) An event flag is indicated.
(15) Reserved.
(16) Unused.
(17) The number of running write commands is indicated.
(18) The number of running read commands is indicated.
(19) The number of waiting write commands is indicated.
(20) The number of waiting read commands is indicated.
(21) Debug information is indicated.
(22) Debug information is indicated.
(23) Reserved.

Figure 12:
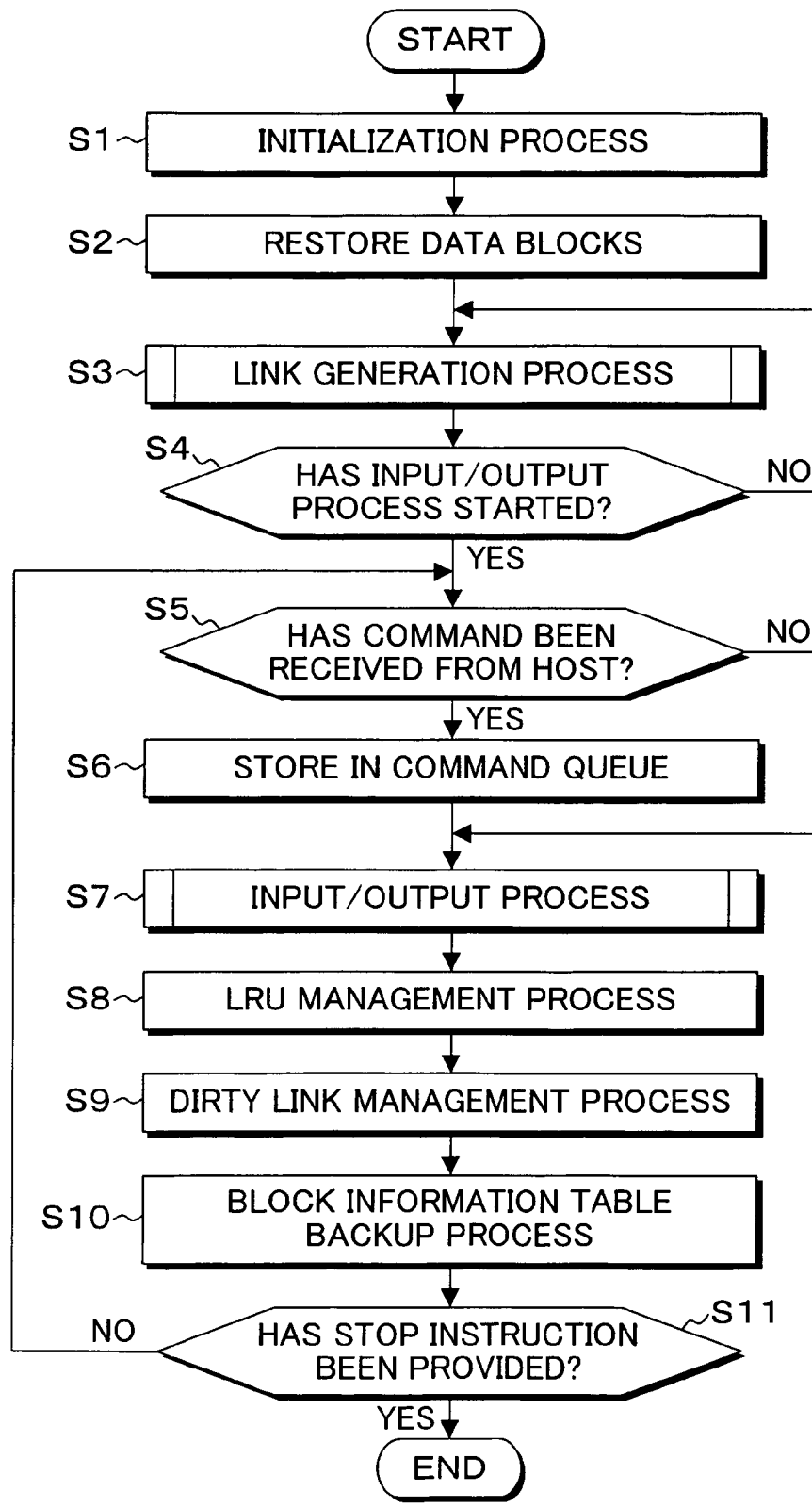
FIG. 12 is a flowchart of a control process of the hierarchical storage system according to the present invention.

FIG. 12 is a flowchart of a control process of the hierarchical storage system in the present invention, which is now described with reference to the functional configuration of FIGS. 6A and 6B as follows. In FIG. 12, when the system is powered on, an initialization process is performed in step S1. In this initialization process, processes of thread initialization and online setting are preformed. Then in step S2, data information blocks are restored from the block information table storage area 75 of the system volume 74 to the memory 38. Then in step S3, a link generation process is performed. Here, when a system operation is started for the first time, no block information tables are stored in the system volume 74. Therefore, a process of restoring data information tables in step S2 and a generation process in step S3 are not performed. On the other hand, if the power is shut down and is turned on again during the system operation, the block information tables stored as a backup in the system volume 74 are restored to the memory 38 in step S2 by the restore unit 92, and then a link generation process is performed in step S3 where the LRU link, the dirty link, and the hit link are reconfigured by the first sort processing unit 94 and the second sort processing unit 96 from the restored block information tables. Then in step S4, it is checked whether an input/output process by the input/output processing unit 82 has started. If it has started, the procedure goes to step S5, where it is checked whether a command has been received from the host 12. If a command has been received from the host, it is stored in step S6 in the command queue 84, and then an input/output process is performed in step S7 with the command being output from the queue. In this input/output process, a process by the write processing unit 85 is performed for a write command, whilst a process by the read processing unit 86 is performed for a read command. Then in step S8, an LRU management process is performed. In the embodiment of the present invention, LRU management in an operation state is not particularly performed. When an operator sets, for example, the number of years for exclusion from the primary storage 68 to LRU management, data blocks having stamps earlier than the set number of years are transferred from the primary storage 68 to the secondary storage 70, and then the data blocks of the primary storage 68 are discarded. Accordingly, the relevant block information tables and link information table are discarded. Then in step S9, a dirty link management process is performed. In the dirty link management process, a dirty rate, which is a ratio of data blocks in a dirty state, is calculated from the status of each data block residing in the primary storage 68. If the dirty rate exceeds a predetermined value, data blocks of predetermined block tables from the LRU side of the dirty link are transferred to the secondary storage 70 for synchronization to increase the number of data blocks being in a hit status, thereby decreasing the dirty rate. Blocks having their status being changed to a hit status in this dirty link management process are each inserted in a position in accordance with a time stamp order of the hit link. Then in step S10, when a predetermined timing comes, that is, any one of the time of new mapping of a data block, the time of changing a data block state, and the time of unmapping comes, a backup process is performed in which the block information tables stored in the block information table area 98 of the memory 38 are transferred to the system volume 74 and are stored in the block information table storage area 75. Such processes in steps S5 to S10 are repeated until a system stop instruction is provided in step S11.

Figure 13A:
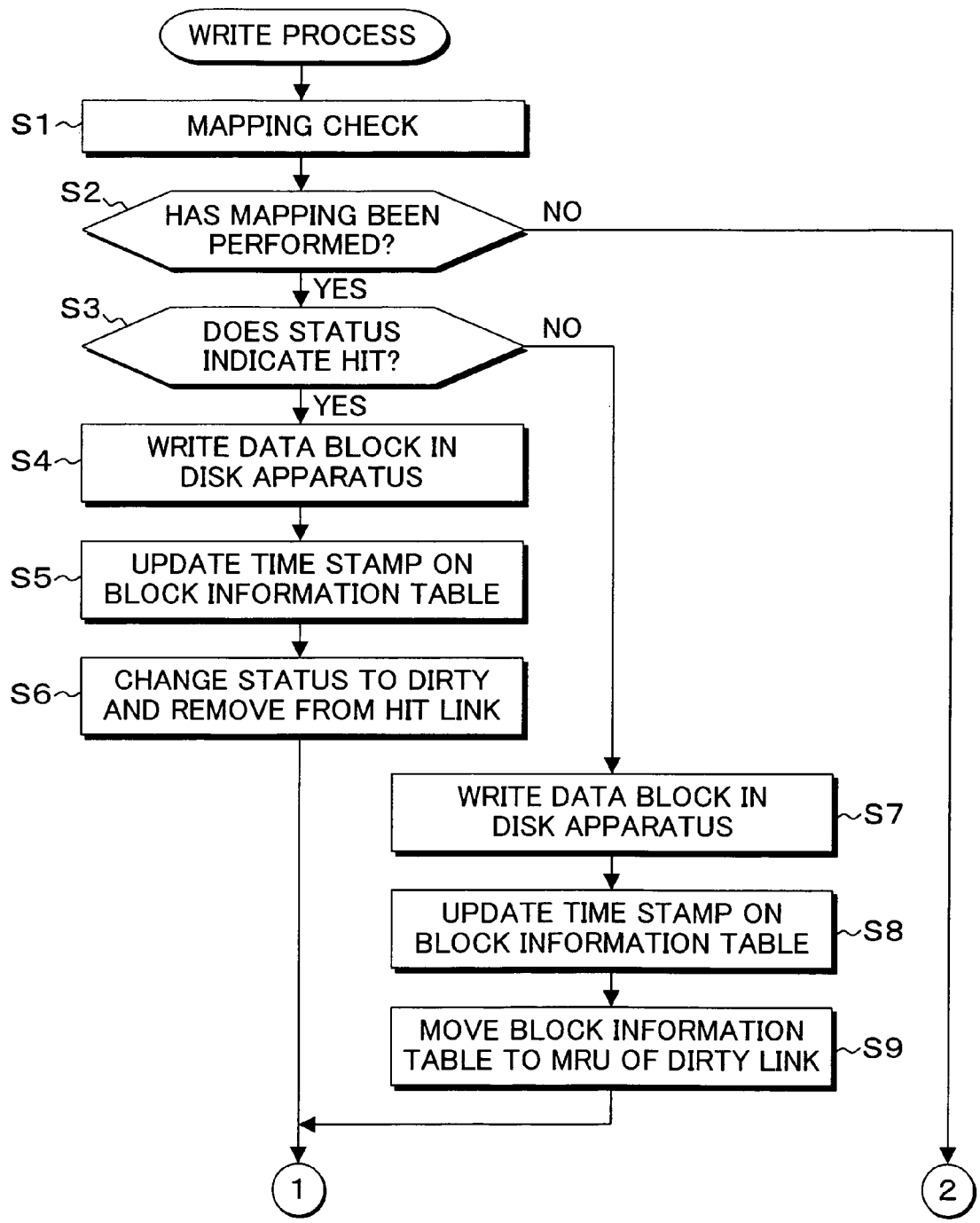
FIGS. 13A and 13B are flowcharts of a write process in the present invention.
Figure 13B:
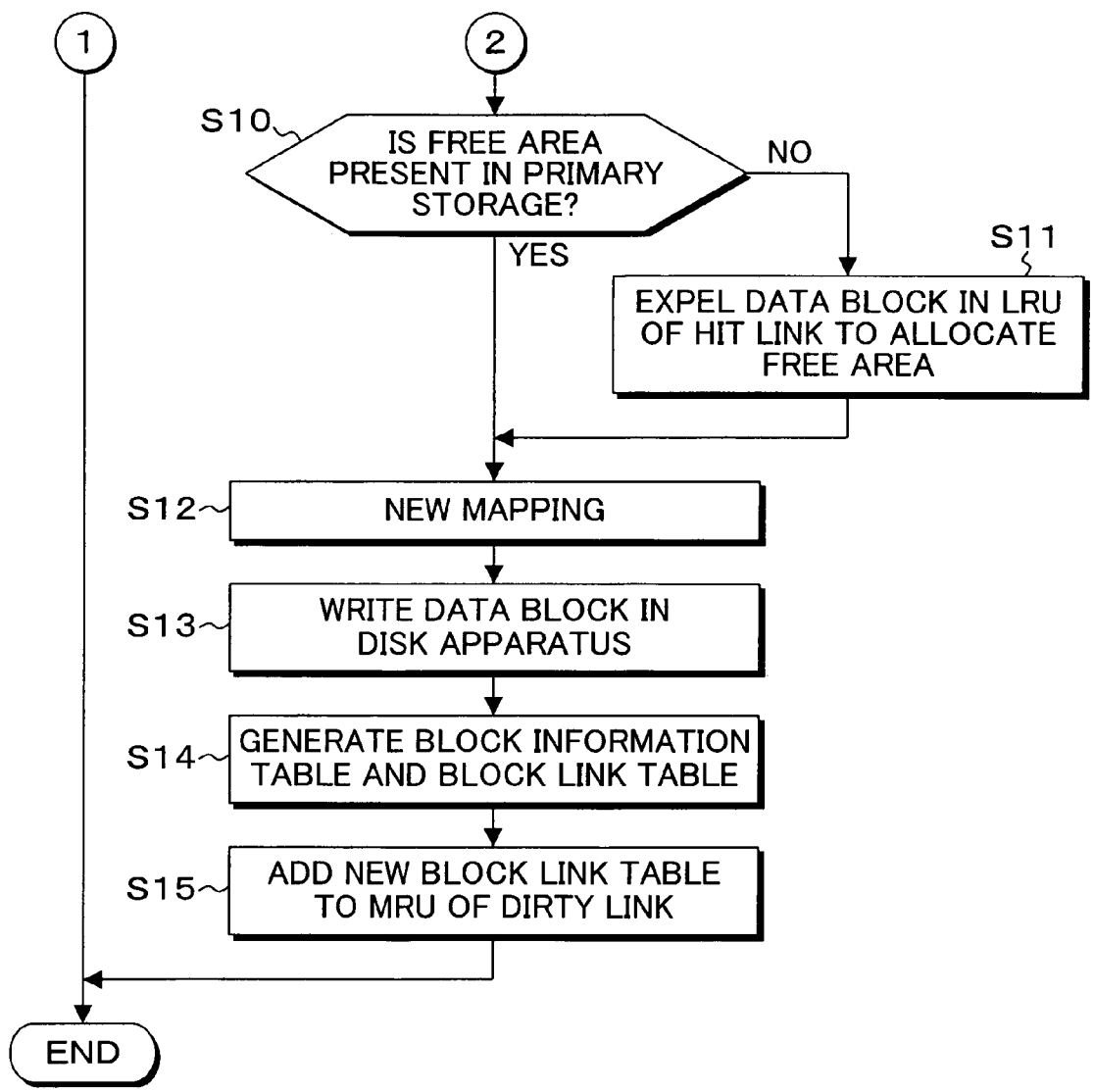

FIGS. 13A and 13B are flowcharts of a write process included in the input/output process in step S7 of FIG. 12 in the present invention. In FIGS. 13A and 13B, the write process is executed by extracting a write command from the command queue 84. In step S1, a mapping check (checking whether allocation to the primary storage 68 has been performed) is carried out. In step S2, it is determined whether mapping has been performed. If mapping has been performed, that is, if a data block is present on the primary storage 68, the procedure goes to step S3, where a status check of the block information table is performed. Here, if the block information table is in a hit status, writing is performed in step S4 on a data block that is present on the primary storage, that is, the disk. Then in step S5, the time stamp of the block information table corresponding to the data block on which writing has been performed is updated. Then in step S6, since the data block is updated on the primary storage 68 to be not synchronized with the data block of the secondary storage 70, as shown in the block information table 112 of FIG. 10, a data block status 124 is changed from hit to dirty. Furthermore, the block information table whose status is changed to a dirty status is excluded from the hit link and is moved in step S9 to the MRU side (the latest value) of the dirty link. In accordance with this change in connection of the block information table from the hit link to the dirty link, pointer information 128 in the link table 114 shown in FIG. 11 is changed from previous/subsequent information (front pointer/back pointer) of the hit link to previous/subsequent information (front pointer/back pointer) of the dirty link. On the other hand, if the block information table is in a dirty status in step S3, a data block is written in step S7 in an actual value of the primary storage 68 to update the already-confirmed data blocks. Then in step S8, the time stamp of a block information table corresponding to the confirmed and updated data block is updated. Then in step S9, a block management table (block information table) is moved to the MRU (the latest side) of the dirty link for change in link connection. Furthermore in step S2, if no block information tables have been mapped, it is checked in step S10 whether a free area is present in the primary storage. If no free area is present, the procedure goes to step S11, where a required amount of data blocks residing at the most LRU (the earliest value) of the hit link is expelled through deletion from the primary storage, thereby allocating a free area. If a free area is allocated or if it is determined in step S10 that a free area has been allocated, the allocated free area is subjected to a new mapping process in step S12. After new mapping is completed, a data block is written in step S13 in the allocated area of the primary storage 68, a block information table and a block link table are generated in step S14, and the block information table is added to the MRU of the dirty link in step S15.

FIG. 14 is a flowchart of a read process in the present invention. The read process is performed by extracting a read command from the command queue 84 by the read processing unit 86. First in step S1, a mapping check is carried out. If it is determined in step S2 that mapping has been performed, a response is made in step S3 to the host 12 by reading a corresponding data block from the primary storage. If it is determined in step S2 that mapping has not been performed, the secondary storage 70 is searched in S4. If it is determined in step S5 that a data block is present on the secondary storage 70, it is checked-in step S6 whether a free area is present in the primary storage 68. If no free area is present, the procedure goes to step S7, where a required amount of data blocks residing at the most LRU (the earliest value) of the hit link is expelled through deletion from the primary storage for expelling, thereby allocating a free area. If a free area is allocated or if it is determined in step S6 that a free area has been allocated, the allocated free area is subjected to a new mapping process in step S8. After new mapping is completed, staging (recall) is performed in step S9 on the allocated area, wherein a data block is transferred from the secondary storage 70 to the primary storage 68. Thereafter in step S10, a block information table and a link table are generated and the block information table is added to the MRU of the hit link. If a mishit occurs as a result of searching at staging in step S5, an error response is made in step S11.

Figure 16:
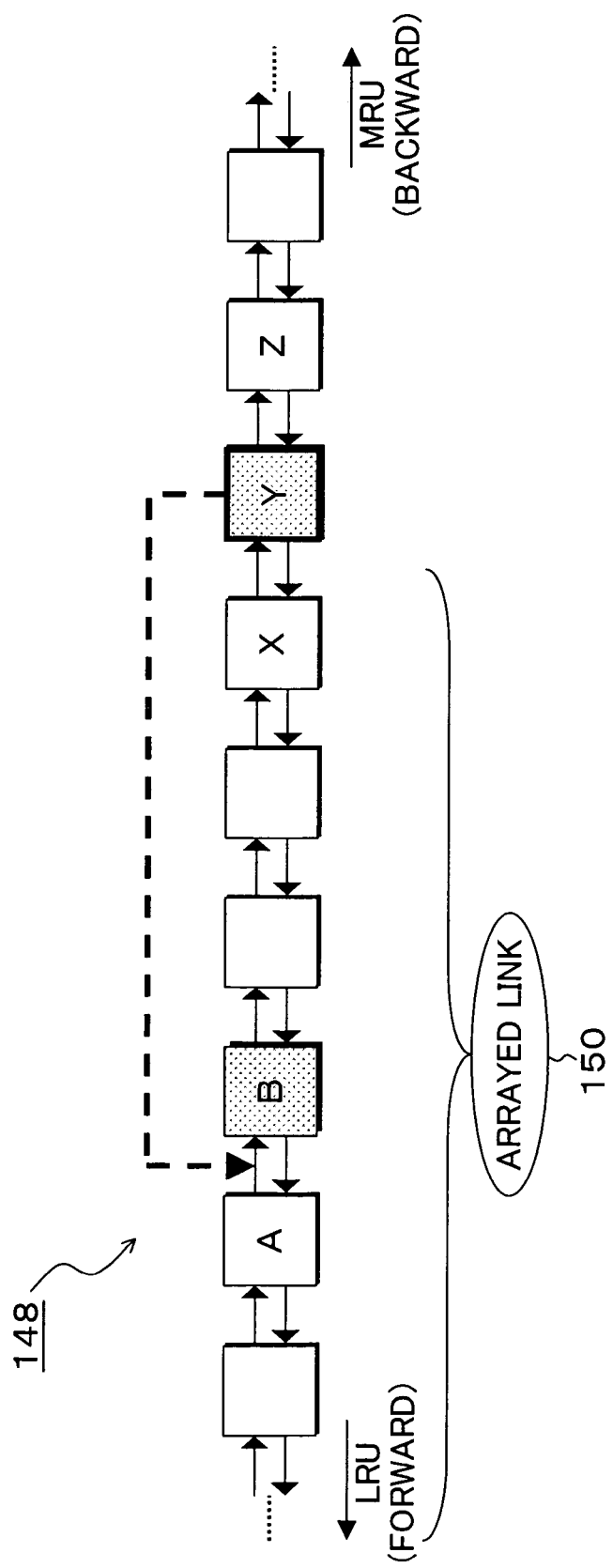
FIG. 16 is a drawing for describing a second sort process to be performed subsequently to the first sort process.
Figure 17:
FIG. 17 is a drawing for describing algorithms in an insert sort process for eight cases corresponding to combinations of three conditions in the second sort process.

FIGS. 16 and 17 are drawings for describing a procedure by the first sort processing unit 94 provided in the configuration managing unit 50 of FIGS. 6A and 6B for reconfiguring the links at power-on again in the present invention.

Figure 15A:
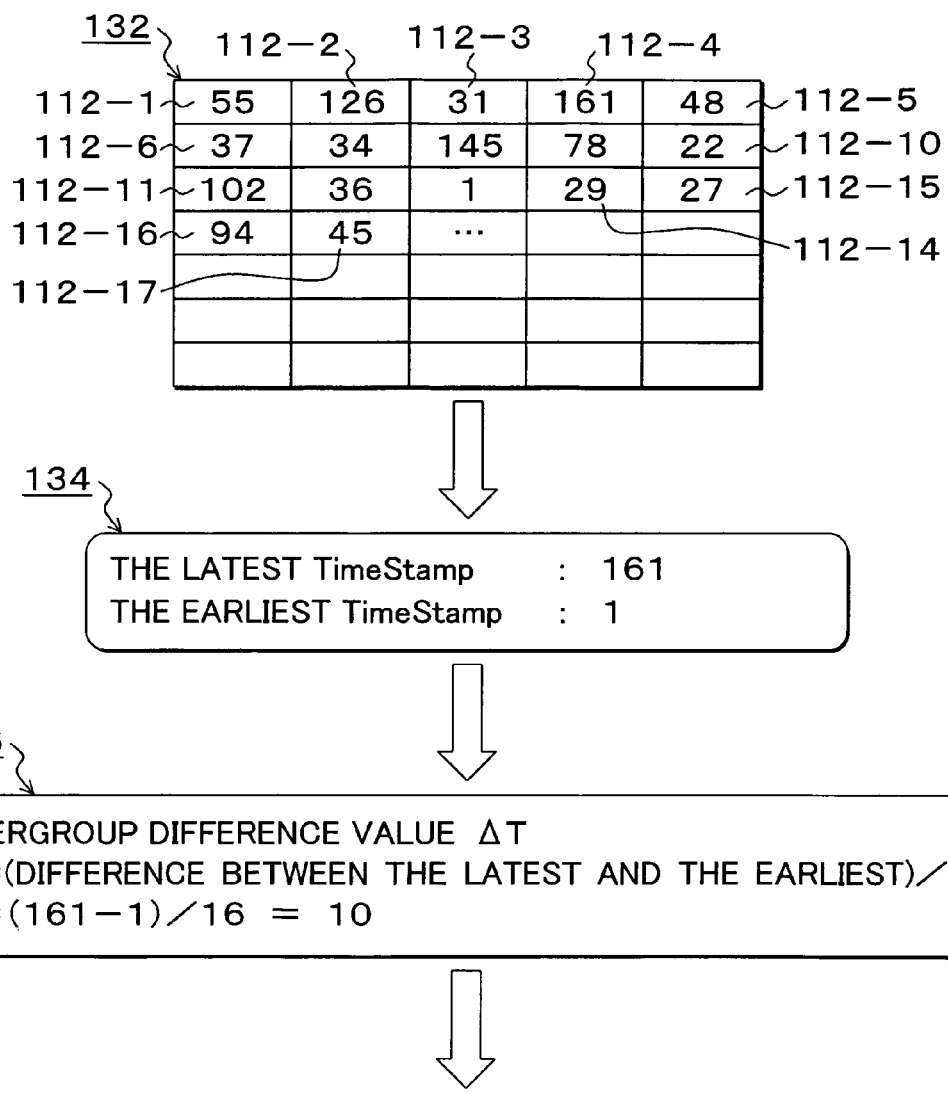
FIGS. 15A and 15B are drawings for describing a first sort process for reconfiguring links at power-on again according to the present invention.
Figure 15B:
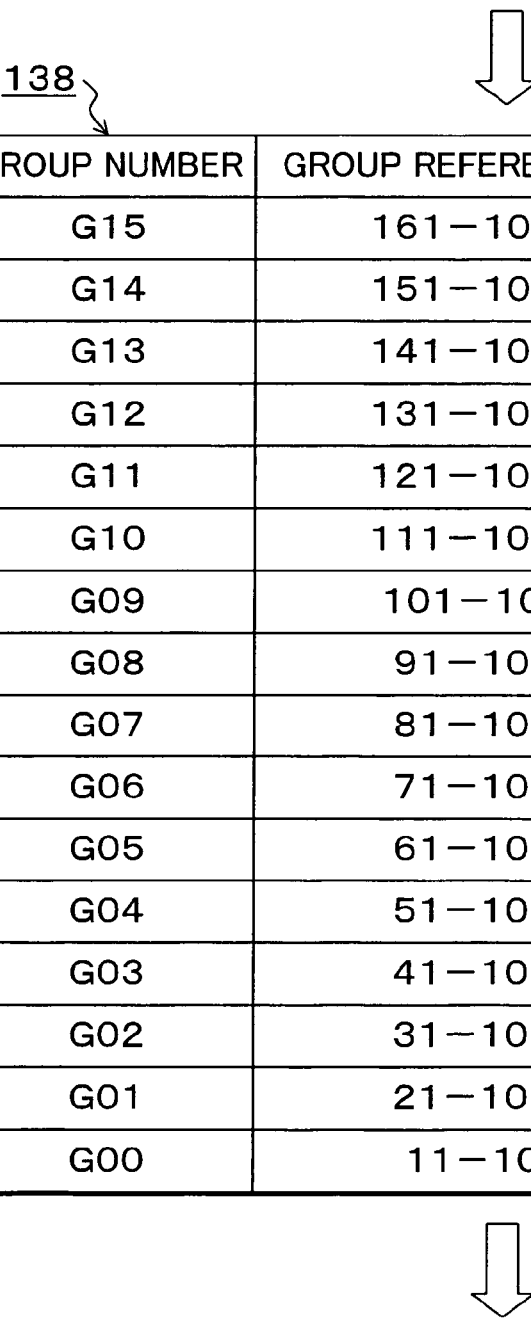

In FIGS. 15A and 15B, when the system is powered on again, a restore process 132 is performed by the restore unit 92 of FIGS. 6A and 6B for restoring block information tables stored as a backup in the block information table area 98 of the memory 38 from the block information table storage area 75 of the system volume 74. With this restore process 132, block information tables 112-1 to 112-17 are developed on the memory 38. Numerals on the block information tables 112-1 to 112-17 each represent a value of a time stamp held by each table. Since these time stamps are updated at the time of writing data blocks during a system operation, the stamps are arrayed at random irrespectively of the addresses where the tables are developed on the memory. Then, a time stamp extraction process is performed for extracting the latest time stamp and the earliest time stamp from the block information tables 112-1 to 112-17 subjected to the restore process 132 and developed on the memory. In this case, the latest time stamp is "161", whilst the earliest time stamp is "1". Then, an intergroup difference calculation process 136 is performed. In the intergroup difference calculation process 136, an intergroup difference value ΔT is calculated by dividing a difference between the latest and earliest time stamps (161-1) by the preset number of groups "16", that is, by (161-1)/16. Thus, ΔT=10 is found. Then, a group range calculation process 138 is performed. Through the group range calculation process 138, the contents in a list shown are found. This list has sixteen groups with group numbers of G15 to G00, and a group reference value and a group range are found for each group. For instance, when the group G15 is taken as an example, its group reference value is "151", which is obtained by subtracting an intergroup difference value D=10 from the latest time stamp "161". Once the group reference value is found, its group range is found as "151 to 161". By sequentially calculating group reference values of the group numbers of G14 to G00 in a similar manner, their group ranges are calculated.

Now with reference to FIGS. 15C and 15D, a group-specific link generation process 140 is then performed. In the group-specific link generation process 140, block information tables having time stamps that belong to time ranges each having the earliest time as an LRU and the latest time as an MRU are extracted and inserted in group terminals 140-1 to 140-16 corresponding to the sixteen groups, and are then disposed in address order. For example, in the group-specific link generation process of FIGS. 15C and 15D, the group terminals 140-2 to 140-4 with the group numbers of G2 to G4 are shown. When the group terminal 140-2 with the group number of G2 is taken as an example, LRU=21 and MRU=30 are found from the group range of FIGS. 15A and 15B, and this time range is taken as a group range "21 to 30". Then, block information tables that belong to this range are extracted in address order from the block information tables 112-1 to 112-17 developed on the memory through the restore process 132 of FIGS. 15A and 15B. In this case, three block information tables, that is, the block information table 112-10 with a time stamp of "22", the block information table 112-14 with a time stamp of "29", and the block information table 112-15 with a time stamp of "27", are extracted and inserted in address order in the group terminal 140-2 with the group number of G2, and a link is generated with front and back pointers. As such, in the group-specific link formed through the group-specific link generation process, it can be seen that time stamps are arrayed in temporal order among the groups, but in each group, time stamps are arrayed not in time-stamp order but in address order. Then, a group classification link generation process 144 is performed. In the group classification link generation process 144, the group-specific links generated in the group-specific link generation process 140 are arrayed in temporal order to form one link, that is, a group classification link 148. In the group classification link 148, time stamps are arrayed in temporal order in comparison in units of group, but in each group, time stamps are arrayed not in time-stamp order but in address order. Thus, what is formed is not a proper link in time-stamp order but an intermediate link.

FIG. 16 is a drawing for describing a second sort process to be performed subsequently to the first sort process shown in FIGS. 16 and 17. In the second sort process, an insert sort process is performed, where, from the group classification link 148 generated in the first sort process, block information tables are extracted one by one from the LRU serving as the earliest side, that is, the forward side; the time stamp of the block information table and the time stamp of a block information table positioned forward thereof are compared with each other; and then rearrangement is performed by inserting the block information table in a position so as to achieve a time-stamp order. In FIG. 16, when a case where insertion and sorting is performed on a process target table Y after an arrayed link 150 is taken as an example, the time stamp of the process target table Y is compared with a time stamp of each of the tables sequentially extracted from the last of the arrayed link 150 positioned forward of the process target table Y to the forward side representing the LRU and, then, for example, a position between a table A and a table B is determined as an insert position. In this manner, once the insert position of the process target table Y is determined, the position of the process target table Y is changed to the position between the table A and the table B. However this positional change of the table is achieved specifically by changing connections of a front pointer and a back pointer represented as arrows and included in each table, the front pointer indicating a forward side of the table and the back pointer indicating a back side thereof. Here, five tables that are subjected to insertion and sorting and require changes of pointer connections are the process target table Y, the table A and the table B before and after the insert position, respectively, and further a table X and a table Z before and after the process target position table Y, respectively. The tables A, B, Y, X, and Z that are subjected to insertion and sorting are referred to as follows.

(1) The table Y is referred to as a process target table.
(2) The table X is referred to as a pre-target-position table.
(3) The table Z is referred to as a post-target-position table.
(4) The table A is referred to as a pre-insert-position table.
(5) The table B is referred to as a post-insert-position table.

In the case of FIG. 16, the process target table Y is inserted between the tables A and B. Therefore, for the pre-insert-position table A, the indication of its back pointer is required to be changed from "B" before insertion to "Y". For the post-insert-position table B, the indication of its front pointer is required to be changed from "A" before insertion to "Y". For the process target table Y, the indication of its front pointer is required to be changed from "X" before insertion to "A" and the indication of its back pointer is required to be changed from "Z" before insertion to "B". Also, for the pre-target-position table X, the indication of its back pointer is required to be changed from "Y" before insertion to "Z". Furthermore, for the post-target-position table Z, the indication of its front pointer is required to be changed from "Y" before insertion to "X". As such, an insert sort process where the group classification link 148 is arrayed based on time stamps is achieved as an algorithm that executes a pointer connection change process through an insertion process. In the second sort process of the present invention, the algorithm in the insert sort process is classified into cases depending on the link state, and an algorithm case uniquely corresponding to the link state for process is selected for executing a link connection change process by changing pointer connections.

FIG. 17 is a correspondence table in which three conditions for determining the link state for the second sort process of the present invention are represented as a decision bit rate b2, b1, b0, and their corresponding algorithms of the insert sort process are associated with eight cases from first case to eighth case. The three conditions providing the decision bit rate b2, b1, b0 in this correspondence table 152 are as follows.

(1) A first condition indicating whether a pre-insert-position table A is present.
(2) A second condition indicating whether the process target table Y has a post-target-position table Z.
(3) A third condition indicating whether the post-insert-position table B and the process target table Y are adjacent to each other. Here, these three conditions (1) to (3) are assigned decision bits b2, b1, and b0. If the condition indicates "present", a bit of 1 is set, and if the condition indicates "negative", a bit of 0 is set. Here, "whether a pre-insert-position table A is present" in the first condition is identical to "whether the insert position is at an LRU end". Also, "whether the process target table Y has a post-target-position table Z" in the second condition is identical to "whether the process target table Y is not at an MRU end".

FIGS. 20 to 27 are drawings for describing insertion and changes in pointer connection with regard to the pointers of the tables before insertion and the pointers and links of the tables after insertion for the first to eighth cases, which are algorithm cases based on combinations of the three conditions represented as the decision bit rate b2, b1, b0 in the correspondence table 152 of FIG. 17.

Figures 18A, 18B:
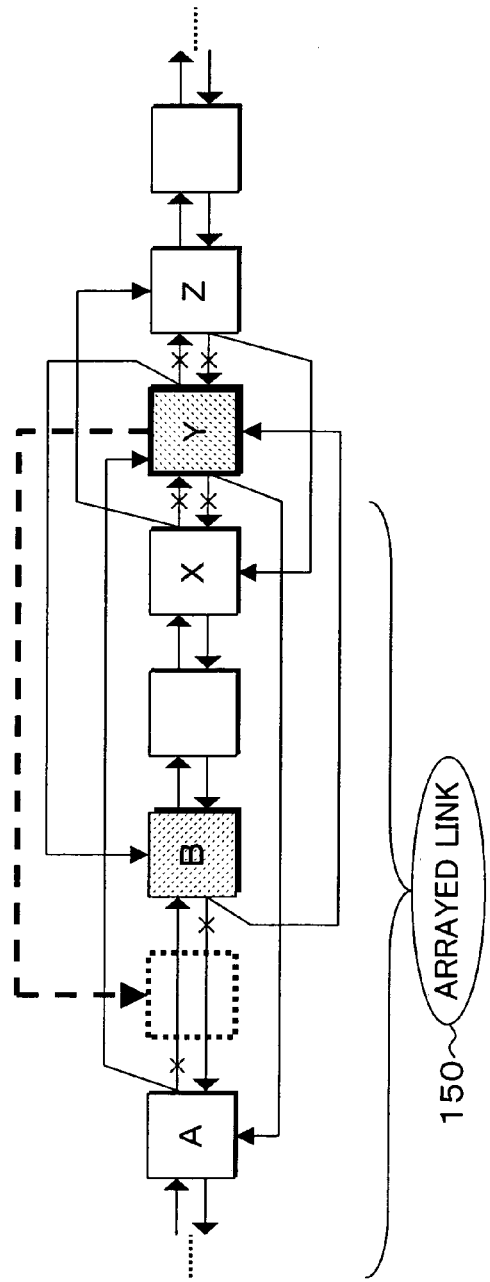
FIGS. 18A and 18B are drawings for describing an insert sort process in a first case.

FIGS. 18A and 18B are drawings for describing a first case where the decision bit rate b2, b1, b0=111. The three conditions of the link state in the first case are:

(1) A pre-insert-position table A is present;
(2) The process target table Y has a post-target-position table Z; and
(3) A post-insert-position table B and the process target table Y are not adjacent to each other. In this case, the algorithm of the first case for changes in pointer connection shown in FIG. 18A is executed. That is, a pre-insert-position table A, a post-insert-position table B, a pre-target-position table X, the process target table Y, and a post-target-position table Z are detected, either a front pointer or a back pointer, or both is set as a pointer name to be changed, and the algorithm for changing the pointers of the block information tables is executed so that a table name designated by each pointer before insertion is changed to a table name designated by each pointer after insertion.

Figures 19A, 19B:
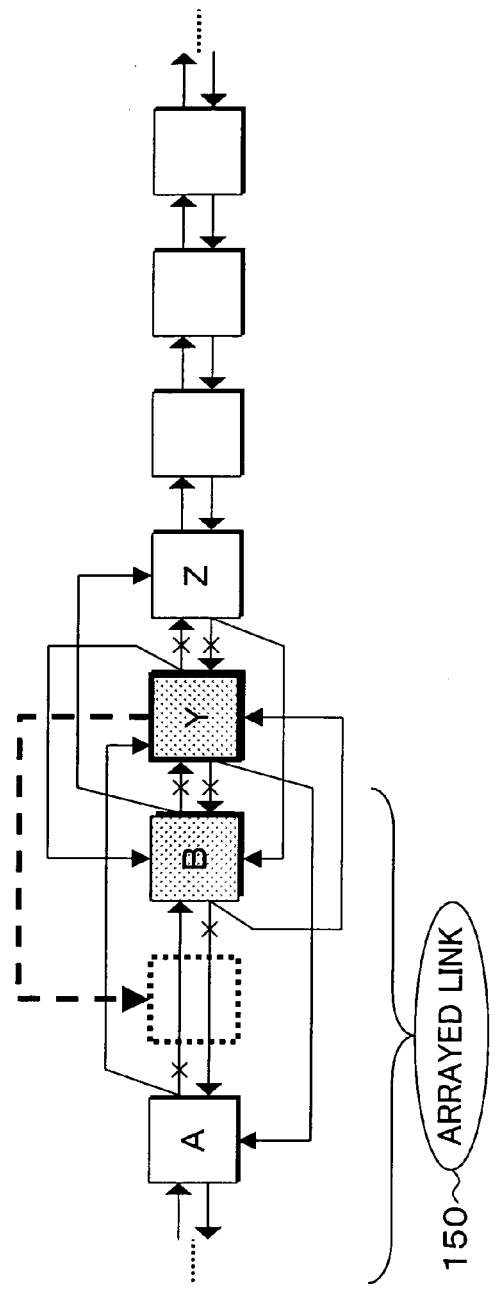
FIGS. 19A and 19B are drawings for describing an insert sort process in a second case.

FIGS. 19A and 19B are drawings for describing a second case where the decision bit rate b2, b1, b0=110. The three conditions of the link state in the this case are, as shown in FIG. 19B, (1) A pre-insert-position table A is present;
(2) The process target table Y has a post-target-position table Z; and
(3) A post-insert-position table B and the process target table Y are adjacent to each other. In this case, pointers of the tables A, B, Y, and Z shown in FIG. 19A before insertion are changed to pointers after insertion. Here, in the second case, no pre-target-position table X is present.

Figures 20A, 20B:
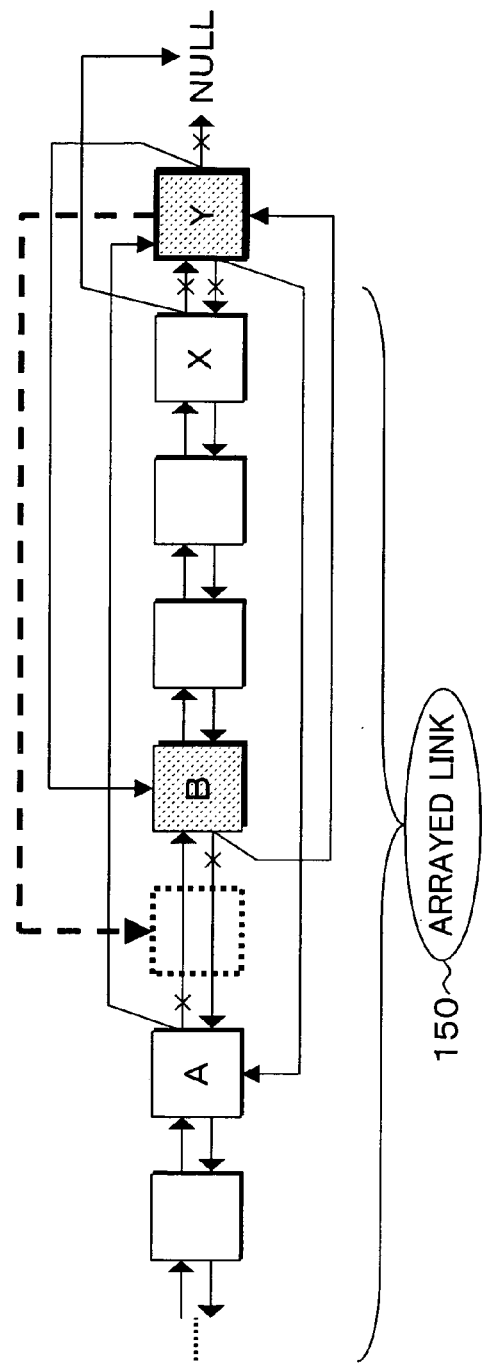
FIGS. 20A and 20B are drawings for describing an insert sort process in a third case.

FIGS. 20A and 20B are drawings for describing a third case where the decision bit rate b2, b1, b0=101. The three conditions of the link state in the third case are, as shown in FIG. 20B, (1) A pre-insert-position table A is present;
(2) The process target table Y does not have a post-target-position table Z; and
(3) A post-insert-position table B and the process target table Y are not adjacent to each other. Here, in the condition (2) where the process target table Y does not have a post-target-position table Z, the process target table Y is located at an MRU, which is the latest side of the link, and, at the rear thereof is "NULL" indicative of a vacancy. In this third case, as shown in FIG. 20A, the tables A, B, X, and Y are processed so that their pointers before insertion are changed to pointers after insertion. With the process target table Y being inserted in an arrayed link 150, the indication of a back pointer of the pre-target-position table X is changed to "NULL" indicating an LRU side.

Figures 21A, 21B:
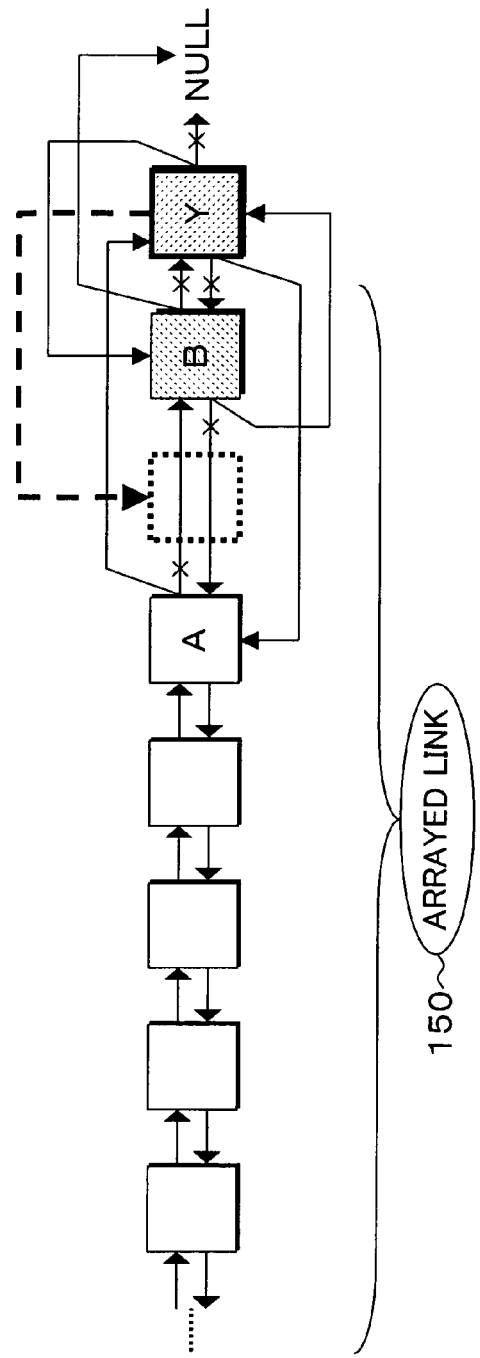
FIGS. 21A and 21B are drawings for describing an insert sort process in a fourth case.

FIGS. 21A and 21B are drawings for describing a fourth case where the decision bit rate b2, b1, b0=100. The three conditions of the link state in the fourth case are, as shown in FIG. 21B, (1) A pre-insert-position table A is present;
(2) The process target table Y has a post-target-position table Z; and
(3) A post-insert-position table B and the process target table Y are adjacent to each other. In this case, as shown in FIG. 21A, the tables A, B, and Y are processed so that their pointer values before insertion are changed to pointer values after insertion.

Figures 22A, 22B:
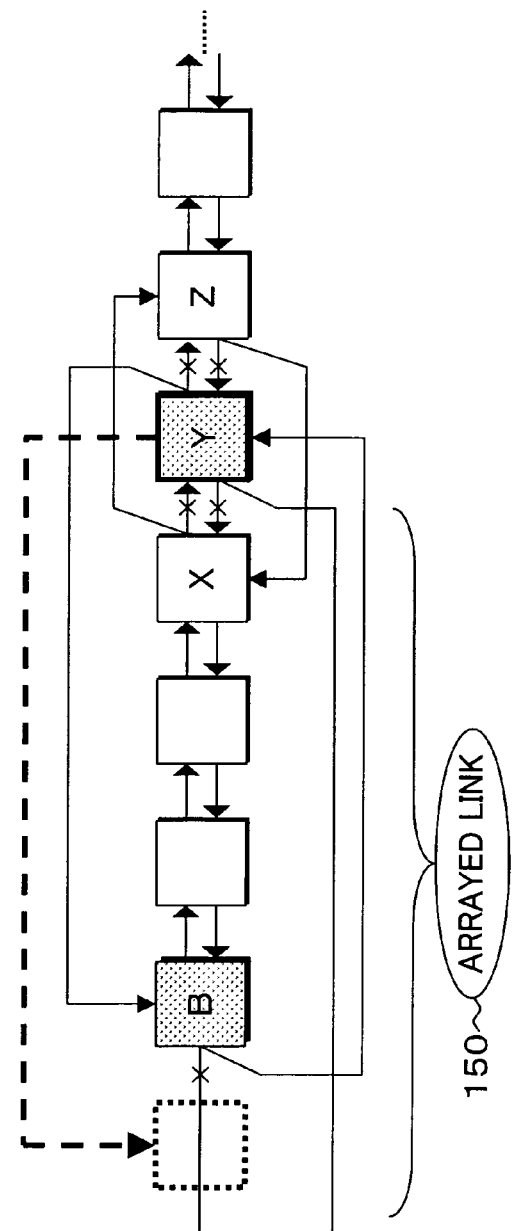
FIGS. 22A and 22B are drawings for describing an insert sort process in a fifth case.

FIGS. 22A and 22B are drawings for describing a fifth case where the decision bit rate b2, b1, b0=011. The three conditions of the link state in the fifth case are, as shown in FIG. 22B, (1) A pre-insert-position table A is not present;
(2) The process target table Y has a post-target-position table Z; and
(3) A post-insert-position table B and the process target table Y are not adjacent to each other. In this fifth case, as shown in FIG. 22B, the tables B, X, Y, and Z are processed so that their pointer contents before insertion are changed to pointer contents after insertion.

Figures 23A, 23B:
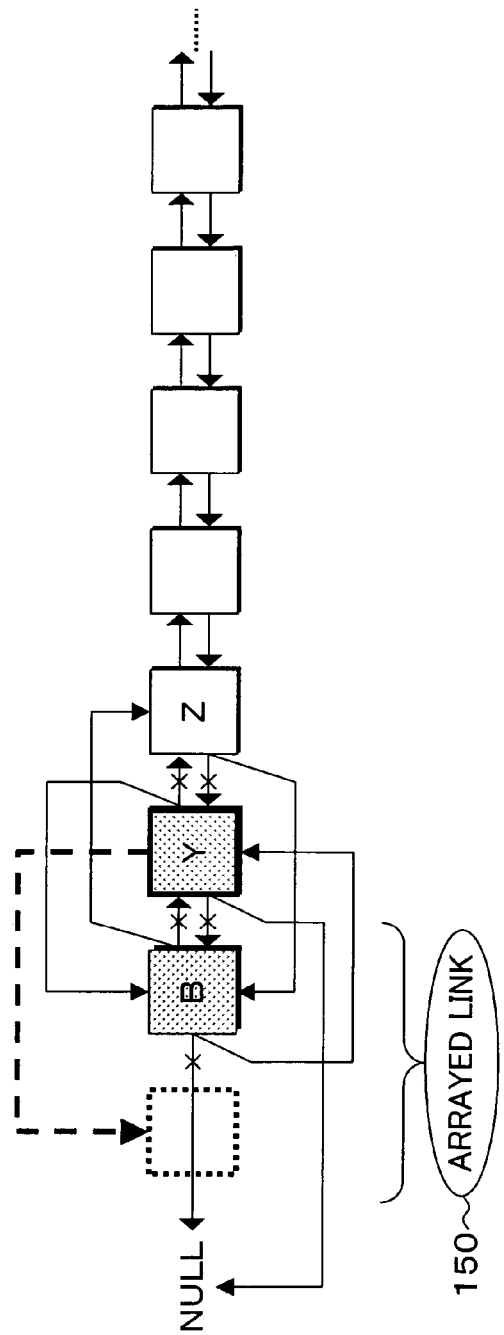
FIGS. 23A and 23B are drawings for describing an insert sort process in a sixth case.

FIGS. 23A and 23B are drawings for describing a sixth case where the decision bit rate b2, b1, b0=010. The three conditions of the link state in the sixth case are, as shown in FIG. 23B, (1) A pre-insert-position table A is not present;
(2) The process target table Y has a post-target-position table Z; and
(3) A post-insert-position table B and the process target table Y are adjacent to each other. In this sixth case, as shown in FIG. 23A, the tables B, X, Y and Z are processed so that their pointer contents before insertion are changed to pointer contents after insertion.

Figures 24A, 24B:
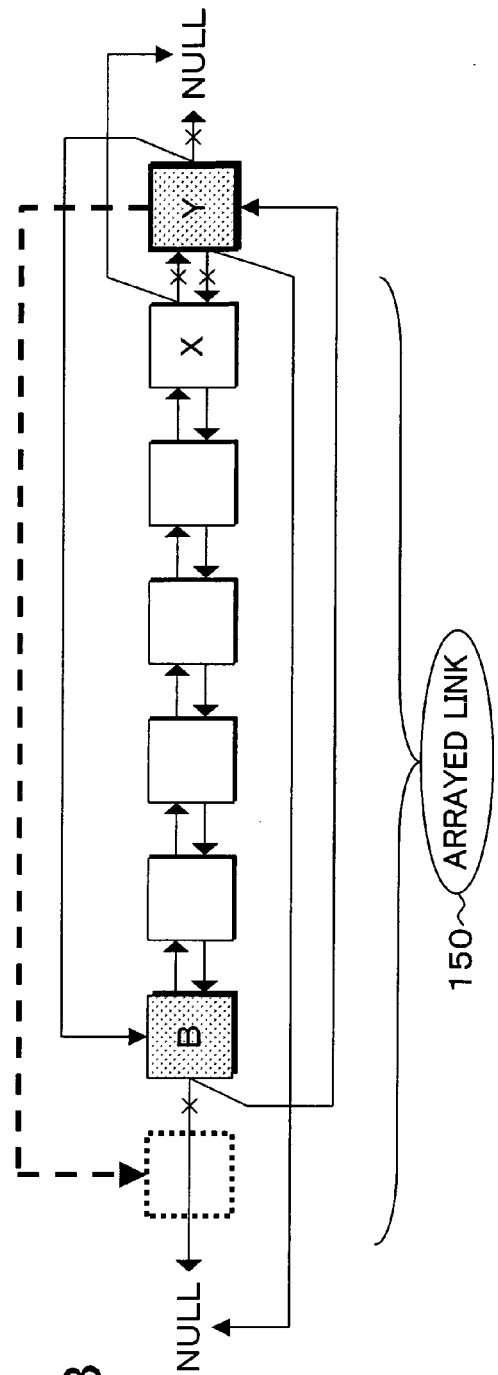
FIGS. 24A and 24B are drawings for describing an insert sort process in a seventh case.

FIGS. 24A and 24B are drawings for describing a seventh case where the decision bit rate b2, b1, b0=001. The three conditions of the link state in the seventh case are, as shown in FIG. 24B,
(1) A pre-insert-position table A is not present;
(2) The process target table Y does not have a post-target-position table Z; and
(3) A post-insert-position table B and the process target table Y are not adjacent to each other. In this seventh case, as shown in FIG. 24A, the tables B, X, and Y are processed so that their pointer contents before insertion are changed to pointer contents after insertion.

Figures 25A, 25B:
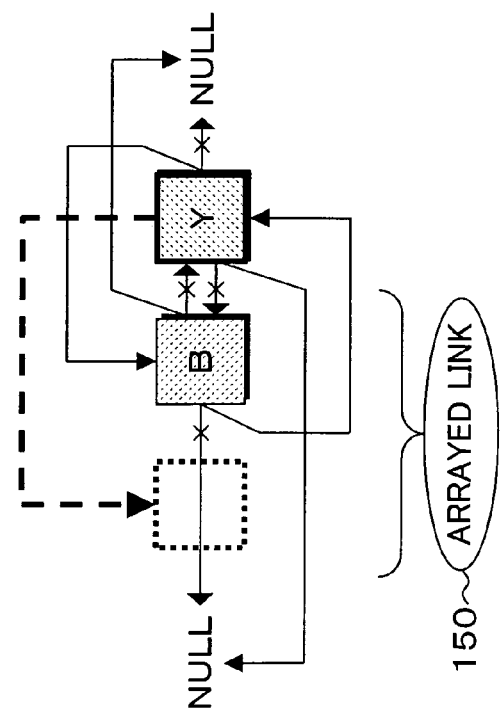
FIGS. 25A and 25B are drawings for describing an insert sort process in an eighth case.

FIGS. 25A and 25B are drawings for describing an eighth case where the decision bit rate b2, b1, b0=000. The three conditions of the link state in the eighth case are, as shown in FIG. 25B,
(1) A pre-insert-position table A is not present;
(2) The process target table Y does not have a post-target-position table Z; and
(3) A post-insert-position table B and the process target table Y are adjacent to each other. In this eighth case, as shown in FIG. 25A, the tables B, X, and Y are processed so that their pointer contents before insertion are changed to pointer contents after insertion.

Figure 26A:
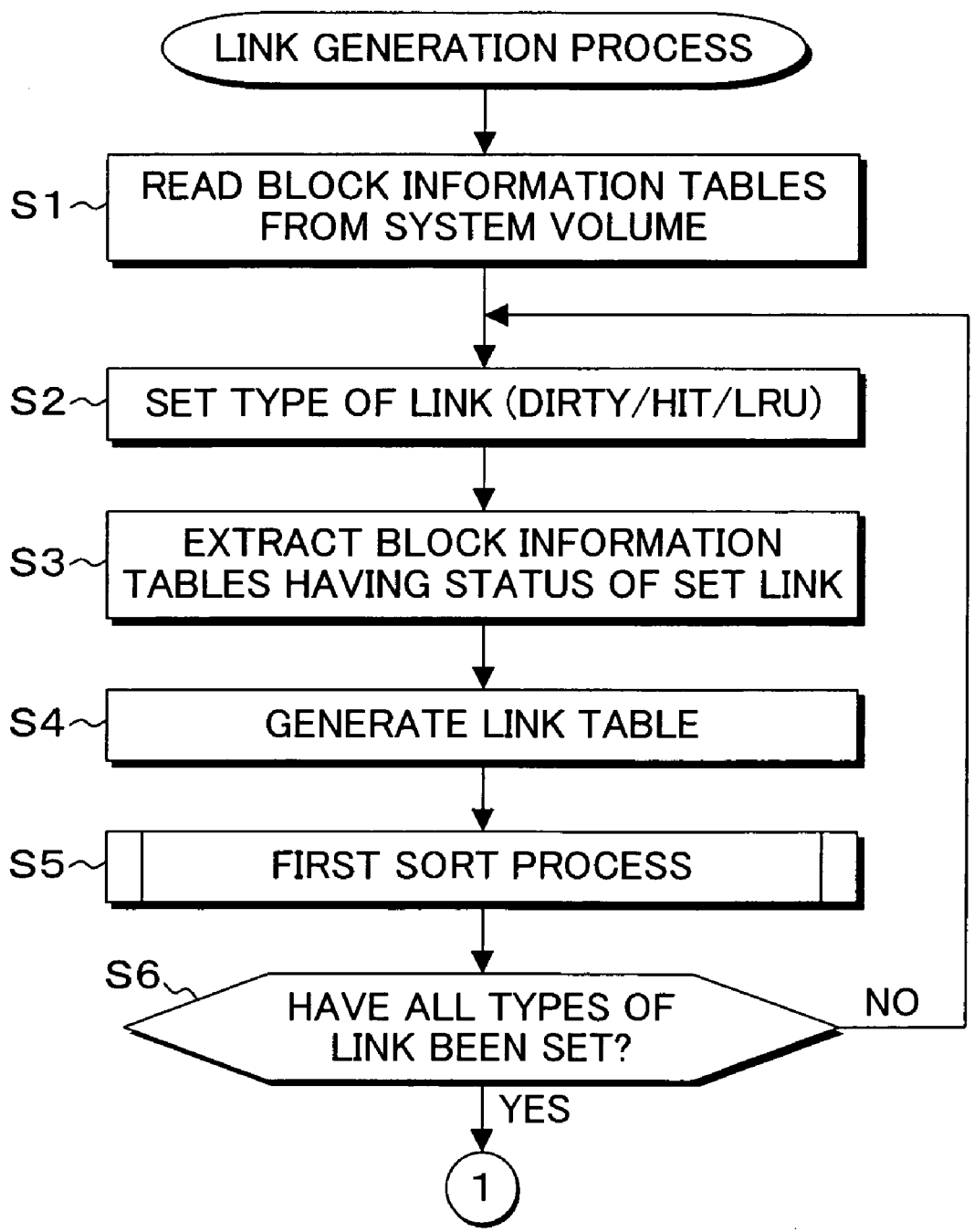
FIGS. 26A and 26B are flowcharts of a link generation process at power-on again according to the present invention.
Figure 26B:
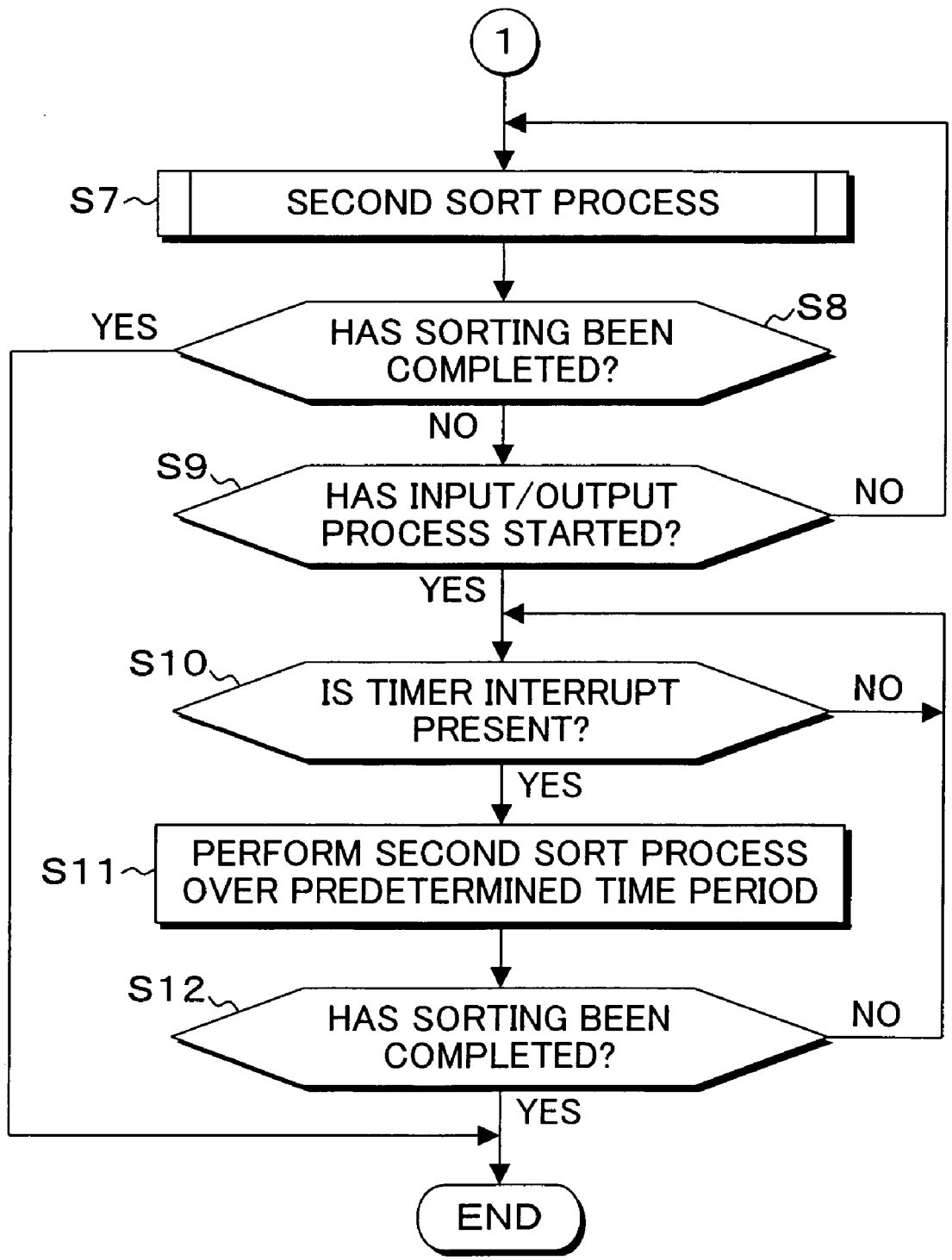

FIGS. 26A and 26B are flowcharts of details of a link generation process at power-on again in step S3 of FIG. 12 in the present invention. In FIGS. 26A and 26B, description is made as follows with reference to the functional configuration of FIGS. 6A and 6B. First in step S1, the block information tables backed-up in the system volume 74 are read in the memory 38. Next in step S2, a type of the link is set. For example, the type of the link is set in the order of the LRU link, the dirty link, and then the hit link. Then in step S3, block information tables having a status of the link are extracted. In this example, the LRU link is first set. Therefore, all block information tables corresponding to the data blocks that are present in the primary storage 68 are extracted. Then in step S4, a link table corresponding to the block information tables is generated. At this stage, pointer information in the link table is vacant, and no link is formed. Next in step S5, as shown in FIGS. 16 and 17, the first sort process is performed to construct a group classification link where grouping is made in time-stamp order. Then in step S6, it is determined whether all link types have been set. If all have not been set, the procedure returns to step S2, where the next link, which is the dirty link, is set, and then processes similar to those mentioned above are repeated. Further, the hit link is then set and then processes similar to those mentioned above are repeated. If it is determined in step S6 that all link types have been set, the procedure goes to step S7, where the second sort process is performed in which links are rearranged in time-stamp order by the second sort processing unit 96 shown in FIGS. 18 to 27. Then in step S8, whether sorting has been completed is checked. If it has not been completed, it is checked in step S9 whether an input/output process has started. If it is determined in step S8, before determining whether an input/output process has started, that sorting has been completed, a series of link generation processes ends. In this case of sorting completion, the sorting process is completed and the link is newly reconstructed during initialization of the system. On the other hand, if it is determined in step S9, before determining that sorting has been completed, that an input/output process has started, sorting is suspended and then whether a timer interrupt is present is checked in step S10. If a timer interrupt is present, the suspended second sort process is performed in step S11 over a predetermined time period. Then in step S12, whether sorting has been completed is checked. Until it is determined that sorting has been completed, processes in step S10 and S12 together with an insert sort process in association with a timer interrupt, that is, the second sort process, are repeated. Upon completion of the sort process in step S12 during an input/output process, a series of link generation processes ends. Also in this case, reconfiguration of the link to achieve a time-stamp order is completed at an early stage after the system is powered on again.

Figure 27A:
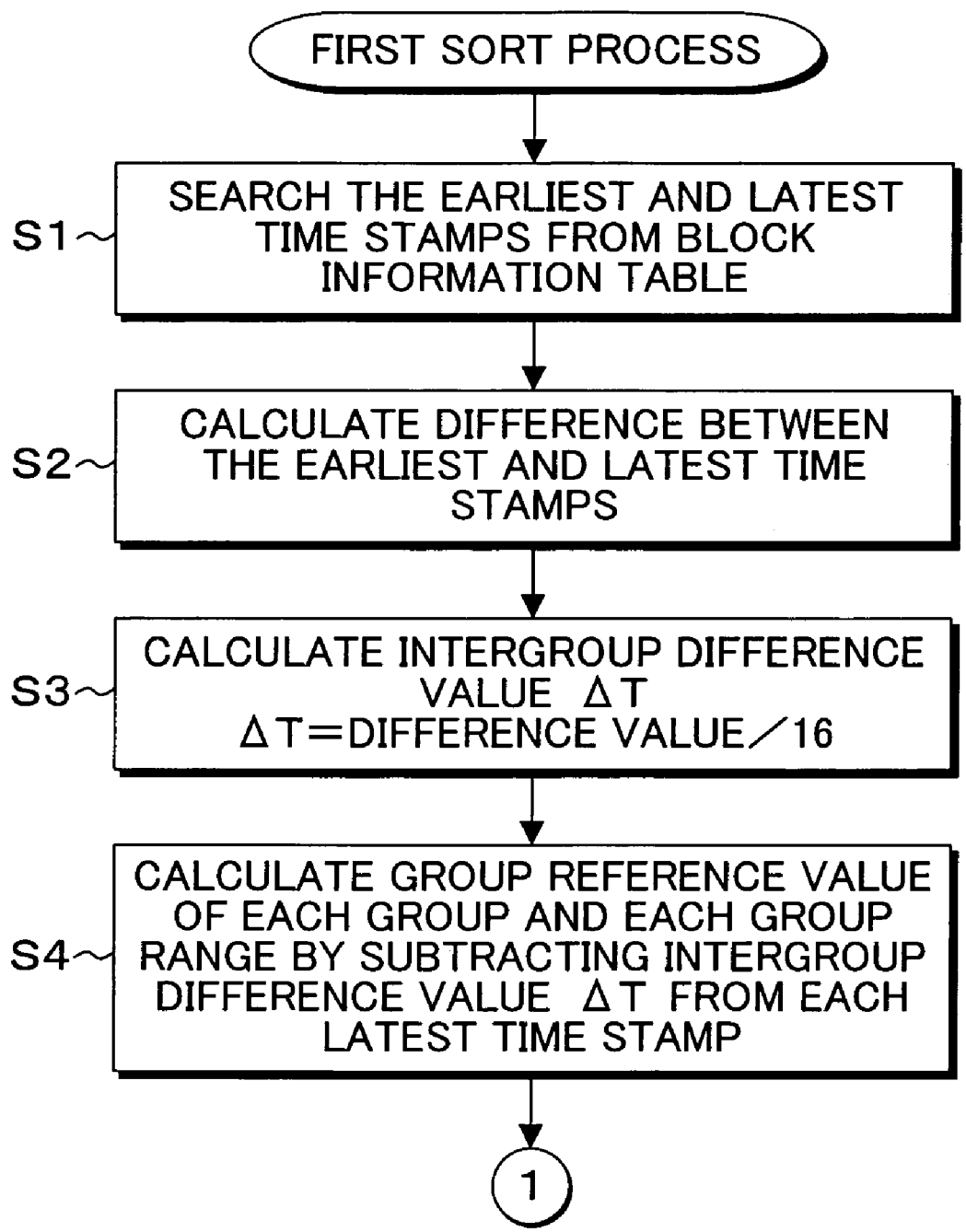
FIGS. 27A and 27B are flowcharts of a first sort process in step S5 of FIGS. 26A and 26B.
Figure 27B:
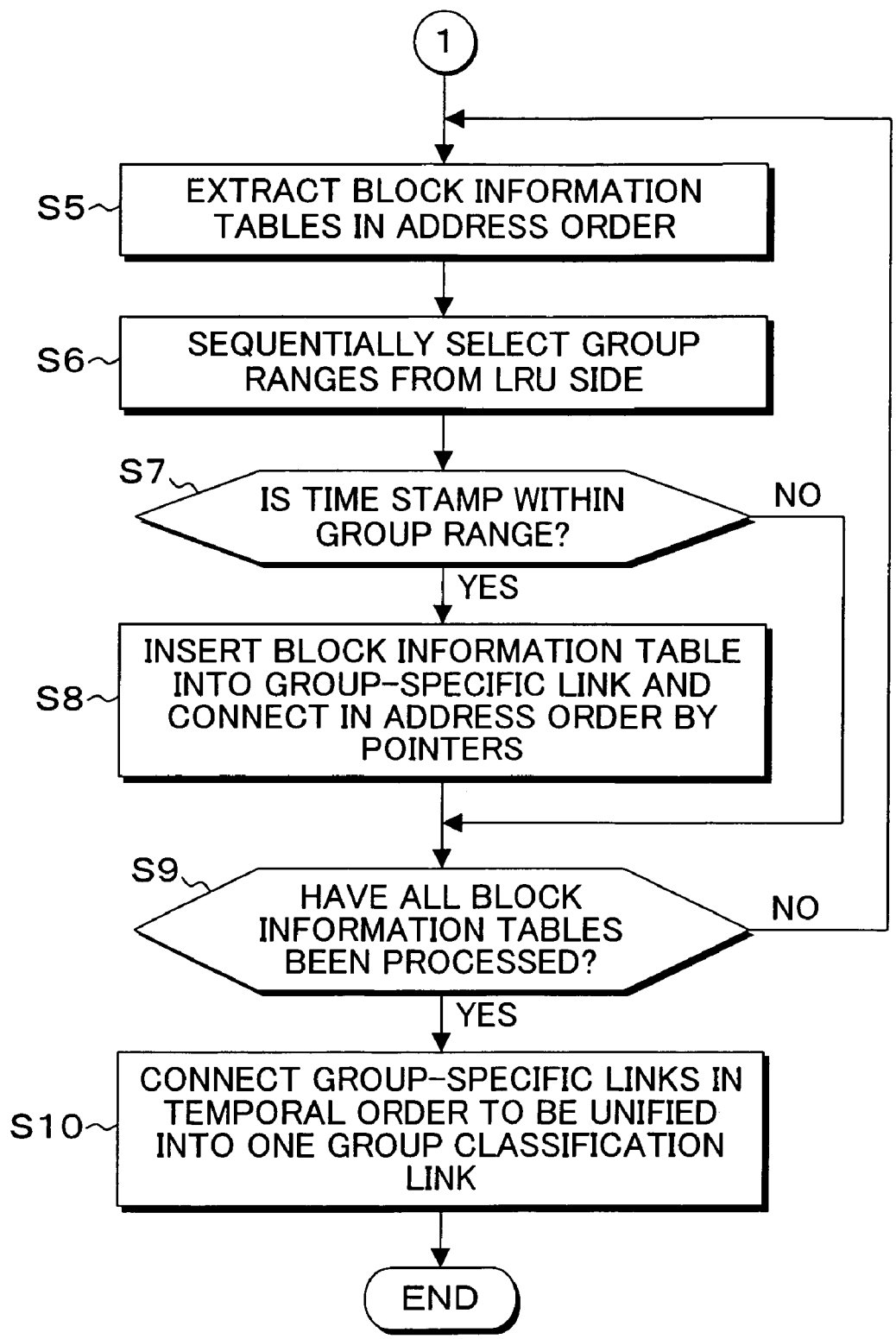

FIGS. 27A and 27B are flowcharts of the first sort process in step S5 of FIGS. 26A and 26B. In FIGS. 27A and 27B, in the first sort process, in step S1, as shown in the time stamp extraction process 134 of FIGS. 15A and 15B, the earliest and latest time stamps are retrieved from the block information tables restored in the memory 38. In step S2, as shown in the intergroup difference calculation process 136 of FIGS. 15A and 15B, a difference between the earliest and latest time stamps is calculated. In step S3, an intergroup difference value $\Delta T$ is calculated through division by the number of groups, for example, 16. Next in step S4, a reference value and a group range of each group are calculated from values obtained by sequentially subtracting the intergroup difference value $\Delta T$ from each latest time stamp, as shown in the list of the group range calculation process 138 of FIGS. 15A and 15B. Next in step S5, the block information tables restored in the memory are extracted in address order, and then in step S6, the group ranges are sequentially selected from top for comparison. As a result of comparison, if it is determined in step S7 the time stamp is within the group range, the table is inserted in that group in step S8. These steps S5 to S8 are of the group-specific link generation process 140 of FIGS. 15C and 15D. If it is determined in step S9 that all block information tables have been processed, the procedure goes to step S10, where, as shown in the group classification link generation process 144 of FIGS. 15C and 15D, the tables of all groups are connected in temporal order to generate one link, that is, the group classification link 148.

Figure 28:
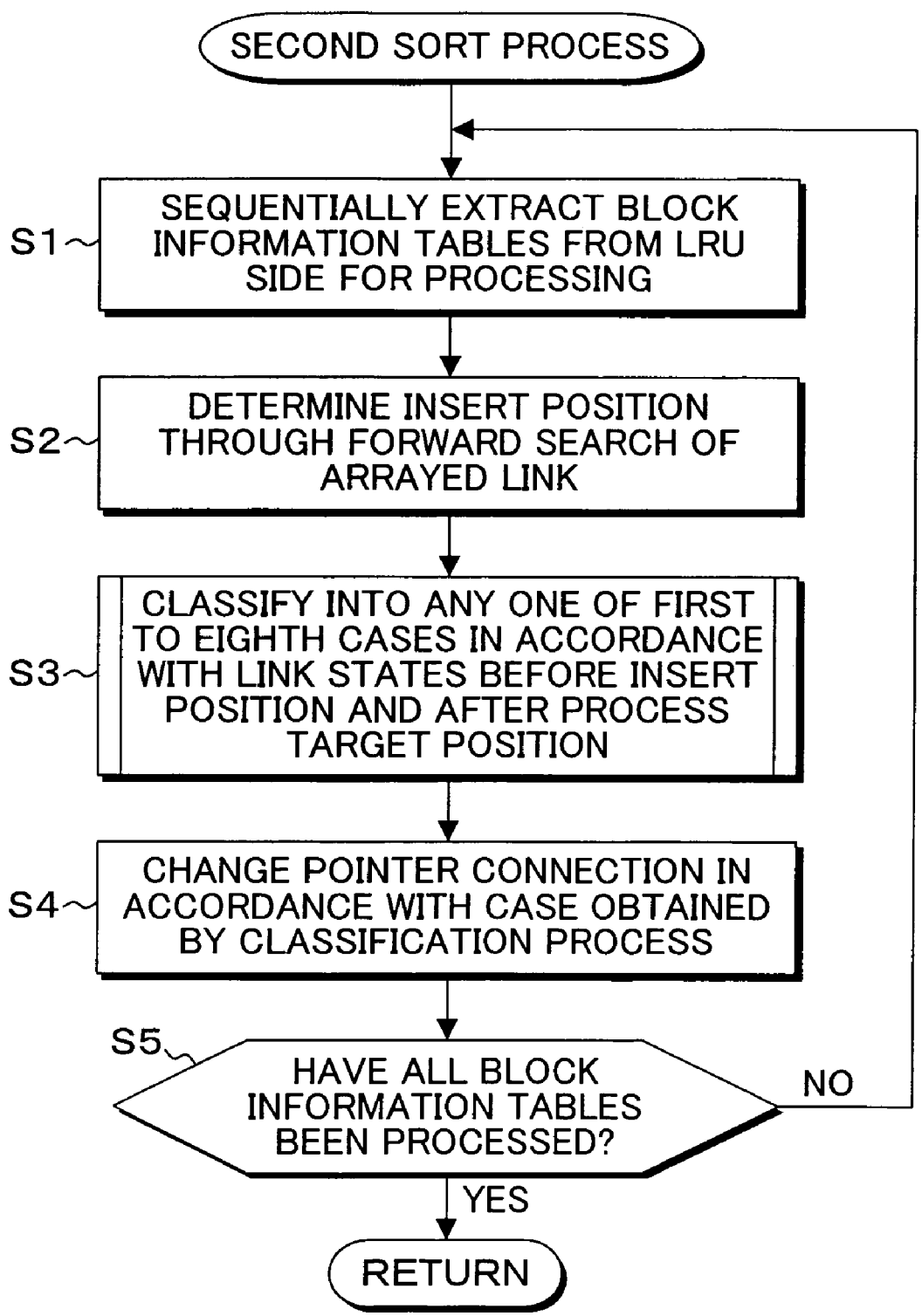
FIG. 28 is a flowchart of a second sort process in step S7 of FIGS. 26A and 16B.

FIG. 28 is a flowchart of the second sort process in step S7 of FIGS. 26A and 26B. In the second sort process, to the group-specific links generated in the first sort process, block information tables are sequentially extracted in step S1 from the LRU side for processing. In step S2, an insert position is determined through a forward search of the arrayed link to determine a target qualification of the time stamp. Then in step S3, the link is classified as any one of first to eighth cases of algorithm cases selected with the decision bit rate b2, b1, b0 in accordance with link states before the insert position and after the process target position, that is, the three conditions of the link states. Then in step S4, a process of changing pointer connections in accordance with the case obtained by classification. These processes in steps S1 to S4 are repeated until it is determined in step S5 that the information tables of all blocks have been processed.

Figure 29:
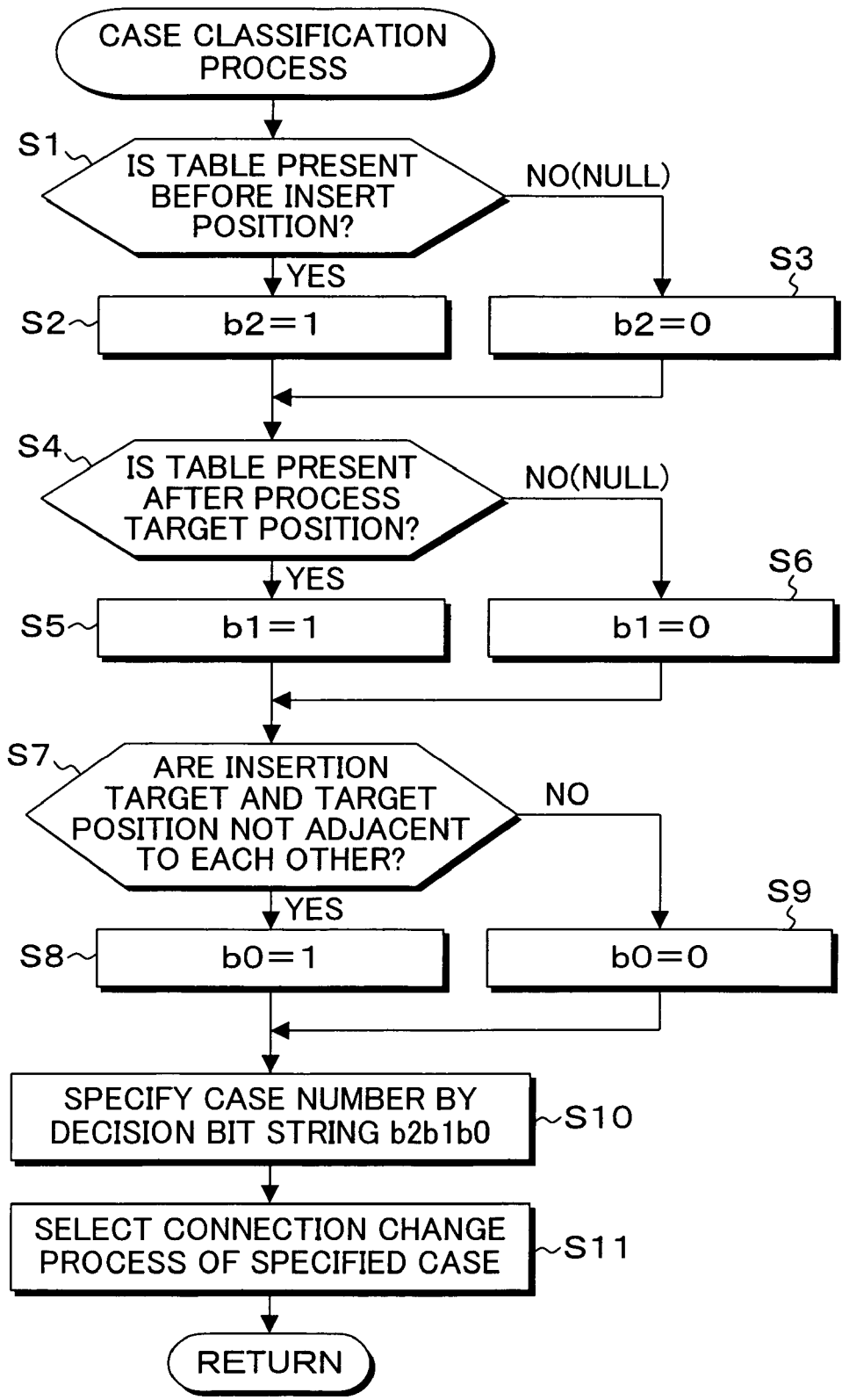
FIG. 29 is a flowchart of a case classification process in step S3 of FIG. 28.

FIG. 29 is a flowchart of the case classification process in step S3 of FIG. 28. In the case classification process of FIG. 29, it is determined in step S1 whether a pre-insert-position table A is present. If it is present, the decision bit b2=1 is set in step S2. If it is not present, that is, if NULL is at the LRU end, the decision bit b2=0 is set in step S3. Then it is determined in step S4 whether a post-target-position table Z is present. If it is present, the decision bit b1=1 is set in step S5. If it is not present, that is, if NULL is at the MRU end, the decision bit b1=0 is set in step S6. It is then checked in step S7 whether tables at the insert position and the target position are not adjacent to each other. If they are not adjacent to each other, the decision bit b0=1 is set in step S8. If they are adjacent to each other, the decision bit b0=0 is set in step S9. Then in step S10, a case number is specified by the decision bit rate b2, b1, b0. In step S11, a connection start process for the specified case number is selected and performed in step S11. As such, any one of the first to eighth cases is temporarily selected based on the decision result of the three conditions in accordance with the link state for processing, and then a pointer connection change process associated with a link insert sort process for the pre-selected case is performed, thereby executing an insert sort process at high speed as a function call process based on the decision conditions. With an increased speed of the second sort process continued from a sort process of a first stage achieved by group-specific links in the first sort process, a link reconfiguration processing time at power-on again can be reduced so as to, in principle, complete link reconfiguration during an initialization process. Also, the present invention provides a sort process program to be executed in a hardware environment of a computer of the petabyte hierarchical storage system 10 of FIGS. 1A and 1B, specifically, a computer including the CPU 36-1 provided in the dedicated module 30-1 at the master side-in the disk array apparatus 16 shown in FIG. 2. The sort process program has contents represented by the flowcharts shown in FIGS. 28, 29, and 30. Furthermore, the sort program of the present invention is held in a storage medium, such as a CD-ROM, a floppy disk (R), a DVD disk, an optical disk, and an IC card, in a database for holding the program via a line, in other computer systems and their data bases, and further in a transmission medium on a line. Still further, in the above embodiment, link reconfiguration in association with power-on again in the hierarchical storage system is taken as an example. Link sorting of the present invention can be applied to an appropriate system or apparatus where a link connecting a plurality of data tables based on pointer information is developed and used on a memory, wherein, without the link table that stores pointers of the link being backed up but with only the data tables being backed up for storage, the link in time-stamp order is reconfigured at power-on again after the link is cut at power shutdown by restoring the backed-up data tables. Still further, the present invention includes appropriate modifications without impairing its objects and advantages, and is also not restricted by numerical values shown in the above embodiment.

What is claimed is:

1. A hierarchical storage system including:
    a hierarchical storage unit formed of a primary storage using a high-speed, small-capacity storage apparatus and a secondary storage using a low-speed, large-capacity storage apparatus, with the primary storage being used as a cache apparatus of the secondary storage,
    a block information table managing unit that generates, when a data block is written in the primary storage, a block information table on a volatile memory for management, the block information table having stored therein a time stamp, and writes block information tables on the volatile memory in the primary storage in each predetermined timing for storage;
    a link managing unit that generates, when the block information table is generated, a link on the volatile memory, the link having the block information table inserted in a position so as to achieve a time-stamp order and connected by pointers, and generates a link table having stored therein the pointers for management on the volatile memory;
    an input/output processing unit that performs an input/output process of the hierarchical storage unit based on a mapping check upon reception of an input/output request of a data block from a higher-level apparatus;
    a restore processing unit that restores the block information tables from the primary storage to the volatile memory at power-on again;
    a first sort processing unit that classifies the restored block information tables into group-specific links of a plurality of time zones and then forms a group classification link by connecting group-specific links in temporal order; and
    a second sort processing unit that sequentially retrieves the block information tables of the group-specific links from an earliest time stamp side for insertion in a position so as to achieve a time-stamp ascending order to reconfigure the link, wherein
        for a connection change process of inserting a process target table in an arrayed link at a position so as to achieve a time-stamp order, with an LRU side of the link being taken as a front and an MRU side of the link being taken as a back, the second sort processing unit sets in advance eight connection change process cases based on combinations of three conditions of:
            a first condition indicating whether a pre-insert-position table (A) is present,
            a second condition indicating whether the process target table (Y) has a post-target-position table (Z), and
            a third condition indicating whether a post-insert-position table (B) and the process target table (Y) are adjacent to each other, and
        every time a process target table is extracted, determines three conditions to select a relevant one of the connection change process cases and perform the connection change process.

2. The hierarchical storage system according to claim 1, wherein the link managing unit generates the link table corresponding to each block information table when the block information table is restored by the restore processing unit to the volatile memory, and stores the pointers connecting the link in the link table when a link is formed by the first sort processing unit and the second sort processing unit.

3. The hierarchical storage system according to claim 1, wherein the first sort processing unit
    generates a plurality of group-specific links by dividing a time period from an earliest time stamp to a latest time stamp obtained through a search from the restored block information tables into a predetermined number of time zones,
    retrieves one of the block information tables in address order and inserts the block information table in one of the group-specific links to which a time stamp belongs for connection in address order, and
    connects the group-specific links in temporal order after grouping to form the group classification link.

4. The hierarchical storage system according to claim 1, wherein
    in a first case where, as the three conditions, a pre-insert-position table (A) is present, the process target table (Y) has a post-target-position table (Z), and further a postinsert-position table (B) and the process target table (Y) are not adjacent to each other, the second sort processing unit changes an indication of a back pointer of the pre-insert-position table (A) to the process target table (Y), changes an indication of a front pointer of the post-insert-position table (B) to the process target table (Y), changes an indication of a back pointer of a pre-process-target-position table (X) to the post-target-position table (Z), and further changes an indication of a front pointer of the process target table (Y) to the pre-insert-position table (A) and an indication of a back pointer thereof to the post-insert-position table (B).

5. The hierarchical storage system according to claim 1, wherein in a second case where, as the three conditions, a pre-insert-position table (A) is present, the process target table (Y) has a post-target-position table (Z), and further a post-insert-position table (B) and the process target table (Y) are adjacent to each other, the second sort processing unit changes an indication of a back pointer of the pre-insert-position table (A) to the process target table (Y), changes an indication of a front pointer of the post-insert-position table (B) to the process target table (Y) and an indication of a back pointer thereof to the post-target-position table (Z), changes an indication of a front pointer of the process target table (Y) to the pre-insert-position table (A) and an indication of a back pointer thereof to the post-insert-position table (B), and further changes an indication of a back pointer of the post-target-position (Z) to the post-insert-position table (B).

6. The hierarchical storage system according to claim 1, wherein in a third case where, as the three conditions, a pre-insert-position table (A) is present, the process target table (Y) does not have a post-target-position table (Z), and further a post-insert-position table (B) and the process target table (Y) are not adjacent to each other, the second sort processing unit changes an indication of a back pointer of the pre-insert-position table (A) to the process target table (Y), changes an indication of a front pointer of the post-insert-position table (B) to the process target table (Y), changes an indication of a back pointer of a pre-target-position table (X) to a link rear end (NULL), and further changes an indication of a front pointer of the process target table (Y) to the pre-insert-position table (A) and an indication of a back pointer thereof to the post-insert-position table (B).

7. The hierarchical storage system according to claim 1, wherein the processes of the restore processing unit, the first sort processing unit, and the second sort processing unit are sequentially performed during an initialization process from a power-on again until the input/output process is performed.

8. The hierarchical storage system according to claim 1, wherein when the link reconfiguration is not completed until the input/output process starts, the second sort processing unit repeats processes of suspending a sort process at the start of the input/output process, resuming the sort process at every predetermined time after the start of the input/output process, and then suspending the sort process after a predetermined time.

9. The hierarchical storage system according to claim 1, wherein the link generated and managed by the link managing unit is any one of:

a hit link connecting, in time-stamp order, block information tables of synchronized data blocks residing both in the primary storage and the secondary storage;

a dirty link connecting, in time-stamp order, block information tables of data blocks residing in the primary storage but not residing in the secondary storage or data blocks residing therein but are not synchronized; or an LRU link connecting, in time-stamp order, block information tables of all data blocks residing in the primary storage.

10. A method of controlling a hierarchical storage system, the hierarchical storage system including:

a hierarchical storage unit formed of a primary storage using a high-speed, small-capacity storage apparatus and a secondary storage using a low-speed, large-capacity storage apparatus, with the primary storage being used as a cache apparatus of the secondary storage, a block information table managing unit that generates, when a data block is written in the primary storage, a block information table on a volatile memory for management, the block information table having stored therein a time stamp, and writes a group of block information tables on the volatile memory in the primary storage in each predetermined timing for storage;

a link managing unit that generates, when the block information table is generated, a link on the volatile memory, the link having the block information table inserted in a position so as to achieve a time-stamp order and connected by pointers, and generates a link table having stored therein the pointers for management on the volatile memory; and an input/output processing unit that performs an input/output process of the hierarchical storage unit based on a mapping check upon reception of an input/output request of a data block from a higher-level apparatus, the method comprising:

a restore processing step of restoring the block information tables from the primary storage to the volatile memory at power-on again;

a first sort processing step of classifying the restored block information tables into group-specific links of a plurality of time zones and then forming a group classification link by connecting group-specific links in temporal order; and a second sort processing step of sequentially retrieving block information tables of the group-specific links from an earliest time stamp side for insertion in a position so as to achieve a time-stamp ascending order to reconfigure the link, wherein for a connection change process of inserting a process target table in an arrayed link at a position so as to achieve a time-stamp order, with an LRU side of the link being taken as a front and an MRU side of the link being taken as a back, the second sort processing step sets in advance eight connection change process cases based on combinations of three conditions of:

a first condition indicating whether a pre-insert-position table (A) is present, a second condition indicating whether the process target table (Y) has a post-target-position table (Z), and a third condition indicating whether a post-insert-position table (B) and the process target table (Y) are adjacent to each other, and every time a process target table is extracted, determines three conditions to select a relevant one of the connection change process cases and perform the connection change process.

11. The method of controlling the hierarchical storage system according to claim 10, wherein in the first sort processing step, a plurality of group-specific links are generated by dividing a time period from an earliest time stamp to a latest time stamp obtained through a search from the restored block information tables into a predetermined number of time zones, one of the block information tables is retrieved in address order and inserted in one of the group-specific links to which a time stamp belongs for connection in address order, and the group-specific links are connected in temporal order after grouping to form the group classification link.

12. A computer-readable storage medium which stores a hierarchical storage program or use with a hierarchical storage system, the hierarchical storage system including:

a hierarchical storage unit formed of a primary storage using a high-speed, small-capacity storage apparatus and a secondary storage using a low-speed, large-capacity storage apparatus, with the primary storage being used as a cache apparatus of the secondary storage, a block information table managing unit that generates, when a data block is written in the primary storage, a block information table on a volatile memory for management, the block information table having stored therein a time stamp, and writes a group of block information tables on the volatile memory in the primary storage in each predetermined timing for storage;

a link managing unit that generates, when the block information table is generated, a link on the volatile memory, the link having the block information table inserted in a position so as to achieve a time-stamp order and connected by pointers, and generates a link table having stored therein the pointers for management on the volatile memory; and an input/output processing unit that performs an input/output process of the hierarchical storage unit based on a mapping check upon reception of an input/output request of a data block from a higher-level apparatus, the program causing a computer to execute steps comprising:

a restore processing step of restoring the block information tables from the primary storage to the volatile memory at power-on again;

a first sort processing step of classifying the restored block information tables into groups of a plurality of time zones and then forming a group classification link by connecting the groups in temporal order; and a second sort processing step of sequentially retrieving block information tables of the group-specific links from an earliest time stamp side for insertion in a position so as to achieve a time-stamp ascending order to reconfigure the link, wherein for a connection change process of inserting a process target table in an arrayed link at a position so as to achieve a time-stamp order, with an LRU side of the link being taken as a front and an MRU side of the link being taken as a back, the second sort processing step sets in advance eight connection change process cases based on combinations of three conditions of:

a first condition indicating whether a pre-insert-position table (A) is present, a second condition indicating whether the process target table (Y) has a post-target-position table (Z), and a third condition indicating whether a post-insert-position table (B) and the process target table (Y) are adjacent to each other, and every time a process target table is extracted, determines three conditions to select a relevant one of the connection change process cases and perform the connection change process.

13. The storage medium according to claim 12, wherein in the first sort processing step, a plurality of group-specific links are generated by dividing a time period from an earliest time stamp to a latest time stamp obtained through a search from the restored block information tables into a predetermined number of time zones, one of the block information tables is retrieved in address order and inserted in one of the group-specific links to which a time stamp belongs for connection in address order, and the group-specific links are connected in temporal order after grouping to form the group classification link.

* * * * *